(12) United States Patent
Nakazawa et al.

(10) Patent No.: US 11,001,933 B2
(45) Date of Patent: May 11, 2021

(54) COMPOSITE BODY

(71) Applicant: TDK CORPORATION, Tokyo (JP)

(72) Inventors: Ryoma Nakazawa, Tokyo (JP);
Kazuhiro Yoshidome, Tokyo (JP)

(73) Assignee: TDK CORPORATION, Tokyo (JP)

(*) Notice: Subject to any disclaimer, the term of this patent is extended or adjusted under 35 U.S.C. 154(b) by 666 days.

(21) Appl. No.: 15/575,587

(22) PCT Filed: Dec. 11, 2015

(86) PCT No.: PCT/JP2015/084811
§ 371 (c)(1),
(2) Date: Nov. 20, 2017

(87) PCT Pub. No.: WO2016/185633
PCT Pub. Date: Nov. 24, 2016

(65) Prior Publication Data
US 2018/0148853 A1    May 31, 2018

(30) Foreign Application Priority Data

May 18, 2015  (JP) .............................. JP2015-100862

(51) Int. Cl.
*C25C 7/02* (2006.01)
*C22C 29/12* (2006.01)
(Continued)

(52) U.S. Cl.
CPC ................ *C25C 7/025* (2013.01); *B22F 5/00* (2013.01); *B22F 7/02* (2013.01); *B22F 7/064* (2013.01);
(Continued)

(58) Field of Classification Search
CPC ........ C25C 7/025; B32B 15/043; B32B 15/20; B22F 2207/01; B22F 2207/03
See application file for complete search history.

(56) References Cited

U.S. PATENT DOCUMENTS 4,529,494 A * 7/1985 Joo' .......................... C25C 3/12
                                                        204/268
6,030,518 A * 2/2000 Dawless ................... C25C 3/06
                                                        204/243.1
(Continued)

OTHER PUBLICATIONS

Copper Alloys—Copper/Nickel Alloys, Nickel Alloys.Net, https://www.nickel-alloys.net/copper_nickel_alloys.html (Year: 2006).*
(Continued)

*Primary Examiner* — Jasper Saberi
(74) *Attorney, Agent, or Firm* — Oliff PLC

(57) ABSTRACT

A composite body has a cermet member, a metal member and an intermediate member. The cermet member includes a cermet oxide phase and a cermet metal phase. The cermet oxide phase contains a Ni-containing oxide or an Fe-containing oxide. The cermet metal phase contains Ni. The intermediate layer contains Cu. The mass proportions of Cu in the cermet metal phase at points which are spaced apart by 10, 50, 100 and 1000 μm from the interface between the cermet member and the intermediate layer to the cermet member side are denoted by C10, C50, C100 and C1000 (mass %). When the mass proportions of Cu in the cermet oxide phase at points which are spaced apart by 10 and 100 μm from the interface to the cermet member side are denoted by M10 and M100 (mass %), C10>C50>C100>C1000, and 5>M10−M100>−5.

21 Claims, 12 Drawing Sheets

(51) Int. Cl.
    *B22F 5/00*           (2006.01)
    *B22F 7/02*           (2006.01)
    *B22F 7/06*           (2006.01)
    *B32B 15/20*         (2006.01)
    *C22C 29/00*        (2006.01)
    *C22C 1/04*          (2006.01)
    *B32B 15/04*         (2006.01)
    *B32B 18/00*         (2006.01)

(52) U.S. Cl.
    CPC ............ *B32B 15/043* (2013.01); *B32B 15/20* (2013.01); *B32B 18/00* (2013.01); *C22C 1/0433* (2013.01); *C22C 29/00* (2013.01); *C22C 29/12* (2013.01); *B22F 2207/01* (2013.01); *B22F 2207/03* (2013.01); *B22F 2998/10* (2013.01); *B22F 2999/00* (2013.01); *B32B 2311/12* (2013.01); *B32B 2311/22* (2013.01); *B32B 2315/02* (2013.01)

(56) References Cited

U.S. PATENT DOCUMENTS

2011/0053041 A1    3/2011   Tucker et al.
2017/0130351 A1*  5/2017   Barthelemy ........ C04B 35/2666
2017/0145552 A1*  5/2017   Hirano ................... B32B 38/00

OTHER PUBLICATIONS

Nickel Ferrite, American Elements, https://www.americanelements.com/nickel-ferrite-12168-54-6 (Year: 2020).*

Adachi Ginya et al., "Handbook of Rare earth material technology, Basic Technology—Synthesis—Device Production—From Evaluation to Resources", NTS Inc., 2008.

Translation of Mar. 1, 1979 Japanese Patent Application No. JPS54-031036U1.

* cited by examiner

COMPOSITE BODY

TECHNICAL FIELD

The present invention relates to a composite body comprising a cermet member, a metal member and an intermediate layer therebetween.

DESCRIPTION OF THE RELATED ART

A chloride electrolytic method and an oxide electrolytic method or so are used for refining a rare earth element. A large amount of chloride gas is generated during the chloride electrolytic method. On the contrary, the gas generated during the oxide electrolytic method which uses an oxide is largely carbon monoxide (CO) or carbon dioxide ($CO_2$) which is derived from a carbon of the positive electrode. Carbon monoxide and carbon dioxide are more preferable than generating the chlorine gas (Non-patent document 1).

Recently, from the point of the global warming, it is demanded to reduce the $CO_2$ gas, and also an inactive positive electrode which does not generate CO and $CO_2$ is demanded. Thus, a cermet material which adds a metal in ceramic has been developed from the point of improving the conductivity of the ceramic (Patent document 1). However, the electrode made of a cermet material has low conductivity against the carbon electrode.

Also, the electrode wherein the ferrite member and the metal member are bonded has been developed. Such electrode allows lowering the electric resistance than the electrode only using the ferrite member, and the power consumption for an electrolytic refining or so can be reduced (Patent document 2). However, in case of using the cermet member in place of the ferrite member of said electrode, the bonding strength between the cermet member and the metal member decreases because a thermal expansion coefficient largely differs between the cermet member and the metal member.

PRIOR ART

Non-Patent Document

Non-patent document 1: Handbook for Rare earth material technology (NTS)

Patent Document

Patent document 1: JP Patent Application Laid Open No. 2011-514931
Patent document 2: JP Utility Model Laid Open No. S54-31036

DISCLOSURE OF INVENTION

Problem to be Solved by the Invention

The present invention is attained in view of such circumstances, and the object is to provide the composite body of the metal member and the cermet member having a sufficient bonding strength.

Means for Solving the Objects

In order to attain the present object, the composite body of the present invention is comprises a cermet member, a metal member, and an intermediate layer, wherein said cermet member includes a cermet oxide phase and a cermet metal phase,
said cermet oxide phase includes an oxide including Ni or an oxide including Fe,
said cermet metal phase includes Ni,
said intermediate phase includes Cu, and
when mass ratios of Cu in said metal phase at positions away by 10, 50, 100, 1000 μm from a boundary between said cermet member and said intermediate layer towards said cermet member are defined as C10, C50, C100 and C1000 (mass %), and also
when mass ratios of Cu in said oxide phase at positions away by 10 and 100 μm from said boundary towards said cermet member side are defined as M10 and M100 (mass %), then following equation 1 and equation 2 are satisfied simultaneously.

$$C10 > C50 > C100 > C1000 \text{ (mass \%)}: \quad \text{(Equation 1)}$$

$$5 > M10 - M100 > -5 \text{ (mass \%)}: \quad \text{(Equation 2)}$$

In the composite body having such characteristic, Cu in the intermediate layer is selectively diffused into the cermet metal phase of the cermet member. Thus, for the composite body, as moving away from the boundary between the intermediate layer and the cermet member towards the cermet member side, the mass ratio of Cu in the cermet metal phase of the cermet member gradually decreases. Thus, in the cermet member, the residual stress is distributed while decreasing gradually. As a result, in the cermet member, there is no local area where the residual stress concentrates; hence the cracks are suppressed from forming.

Also, by using Ni in the cermet oxide phase and the cermet metal phase of the cermet member, Ni will diffuse to the intermediate layer, hence the difference of the thermal expansion coefficient of the cermet member can be regulated relatively low at the area near the boundary between the intermediate layer and the cermet member.

Further, for said composite body, the metal member is preferably Ni or an alloy of Ni. Thereby, Ni can be supplied to the intermediate layer from the metal member as well, thus bonding strength can be further enhanced. Also, Ni has low solubility towards a molten salt, thus by selecting Ni or alloy including Ni as the metal used for the metal member, the durability when carrying out a molten salt electrolytic method can be enhanced.

Next, for the intermediate layer of said composite body, when the mass ratio of Ni and Cu are expressed in terms of percentage, preferably Ni is 10<Ni<70 (mass %) and Cu is 30<Cu<90 (mass %). Thereby, the diffusion of Cu into the cermet metal phase of the cermet member is enhanced, and the stronger bonding strength can be attained.

Also, for said composite body,
said intermediate layer may at least comprise a first intermediate layer and a second intermediate layer,
said first intermediate layer may be bonded to said cermet member,
said first intermediate layer may at least include Cu as a first metal,
said second intermediate layer may at least include M2 as a second metal,
a melting point of Cu as said first metal may be lower than the melting point of M2 as said second metal,
a mass concentration of Cu in said first intermediate layer may be higher than the mass concentration of Cu in the said second intermediate layer, and said mass concentration of M2 in said second intermediate layer may be higher than the mass concentration of M2 in said first intermediate layer.

Further, said first intermediate layer may be also bonded to said second intermediate layer.

Further, said second intermediate layer may be also bonded to said metal member.

Further, a mass ratio between Cu and M2 (Cu/M2) in said first intermediate layer is preferably within the range of below equation 3.

$$40/60 \leq Cu/M2 \leq 90/10 \quad \text{(Equation 3)}$$

Further, M2 may be Ni.

Further, said intermediate layer may comprise a third intermediate layer in addition to said first intermediate layer and said second intermediate layer, and said third intermediate layer may be bonded to said metal member.

Further, the mass concentration of Cu in said third intermediate layer is preferably higher than the mass concentration of Cu in said second intermediate layer, and the mass concentration of M2 in said third intermediate layer is preferably lower than the mass concentration of M2 in said second intermediate layer.

Further, said second intermediate layer may be bonded to said first intermediate layer and said third intermediate layer.

Further, said cermet oxide phase included in said cermet member preferably at least includes an oxide of Ni.

Further, at least part of said cermet oxide phase included in said cermet phase is preferably made of nickel ferrite.

Further, said intermediate layer preferably includes an intermediate oxide phase and an intermediate metal phase, and said intermediate oxide phase preferably includes at least one oxide of metal.

Further, said at least one oxide of metal is preferably selected from the oxide of metal included in the cermet oxide phase.

Further, at a cross section face where said composite body is cut perpendicularly to the boundary between said cermet member and said intermediate member, in case a total of an area occupied by said intermediate oxide phase and an area occupied by said intermediate metal phase at an area where said intermediate oxide phase exists is 100%, then an area ratio occupied by said intermediate oxide phase is preferably 10% to 50%.

Further, 30% or less of the area is preferably occupied by a void with respect to entire said intermediate layer.

Also, in case an area of said cermet oxide phase at the cross section of said cermet member is $S_o$, an area of said cermet metal phase is $S_m$, and an area ratio between said cermet oxide phase and said cermet metal phase is $S_o/S_m$, then $S_o/S_m$ preferably satisfies the following equation 4.

$$60/40 \leq S_o/S_m \leq 90/10 \quad \text{(Equation 4)}$$

Further, said cermet oxide phase preferably comprises a spinel ferrite phase expressed by a compositional formula of $Ni_xFe_yM_zO_4$ (x+y+z=3, x≠0, y≠0, M is at least one selected from the group consisting of Al, Co, Cr, Mn, Ti, Zr, Sn, V, Nb, Ta, and Hf), and a nickel oxide phase expressed by a compositional formula of $Ni_xFe_{1-x}O$ (x'≠0), wherein in case entire said cermet member including said cermet oxide phase and said cermet metal phase is 100 mass %, a content ratio of said spinel phase is preferably 40 to 80 mass %, a content ratio of said nickel oxide phase is preferably 0 to 10 mass % (including 0 mass %), and a content ratio of said cermet metal phase is preferably 15 to 45 mass %.

Further, an average composition of said spinel ferrite phase included in said cermet member is preferably expressed by a compositional formula of $Ni_{x1}Fe_{y1}M_{z1}O_4$ (0.60≤x1≤0.90, 1.90≤y1≤2.40, 0.00≤z1≤0.20).

Further, said nickel oxide phase is preferably included in said cermet member, and an average composition of said nickel oxide phase is preferably expressed by a compositional formula of $Ni_{x'1}Fe_{1-x'1}O$ (0.70≤x'1≤1.00).

Effects of the Invention

The composite body having the above mentioned structure which comprises the cermet member and the metal member has a higher bonding strength than the conventional ones. That is, according to the present invention, the composite body comprising the cermet member and the metal member with higher bonding strength than the conventional ones can be obtained.

THE BEST MODE FOR CARRYING OUT THE INVENTION

The embodiment of the present invention will be described by referring to the figures. The present invention is not to be limited to the description of the below embodiment. Also, the below described constitutional elements include those which can be easily anticipated by the ordinary skilled in the art and also those substantially the same. Further, the constitutional elements described in below can be combined accordingly.

Figure 1A:
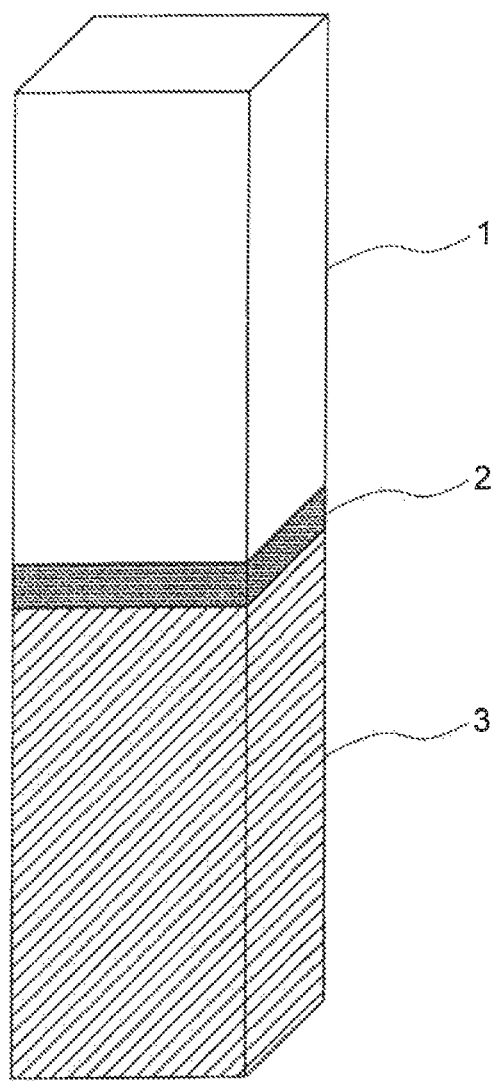
FIG. 1A is a schematic diagram showing the condition wherein the intermediate member is placed between the cermet member and the metal member in order to obtain the composite body according to one embodiment of the present invention.
Figure 1B:
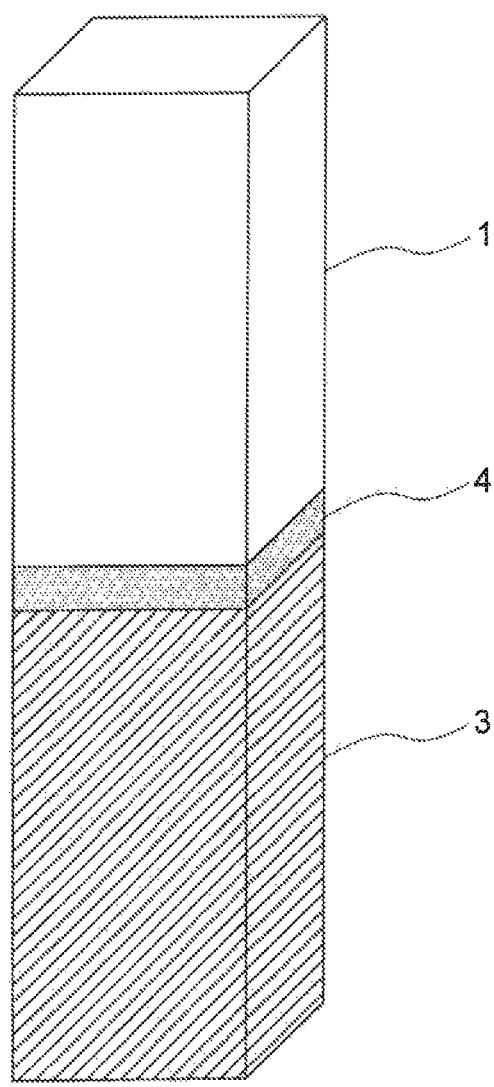
FIG. 1B is a schematic diagram of the composite body comprising the cermet member and metal member via the intermediate layer according to one embodiment of the present invention.

The steps for obtaining the composite body of the cermet member-metal member of the present embodiment will be explained. The production steps of the composite body according to the present invention can be largely separated into three steps which are a step of obtaining a Ni based ferrite from $Fe_2O_3$ and NiO, a step of obtaining a cermet member from the Ni based ferrite and the metal powder, and a step of obtaining a cermet-metal composite body from the cermet member, the intermediate member and the metal member. Among these, as shown in FIG. 1A, during the step of obtaining the cermet-metal composite body from the cermet member, the intermediate member and the metal member, the heat treatment is carried out while placing the intermediate member 2 including Cu between the metal member 1 and the cermet member 3. Thereby, as shown in FIG. 1B, the intermediate member 2 transforms to intermediate layer 4, and the metal member 1 and the cermet member 3 are bonded via said intermediate layer 4. As a result, the cermet-metal composite body of the present embodiment can be obtained. Note that, hereinafter, the cermet-metal composite body may be simply referred as the composite body.

As shown in FIG. 1B, in the composite body comprising the cermet member and the metal member via the intermediate layer according to one embodiment of the present embodiment, the metal member 1 and the cermet member 3 are bonded via the intermediate layer 4. Also, there are no particular limitation of size regarding the metal member 1, the cermet member 3 and the intermediate layer 4, and it may be any size depending on the purpose of use.

Figure 2A:
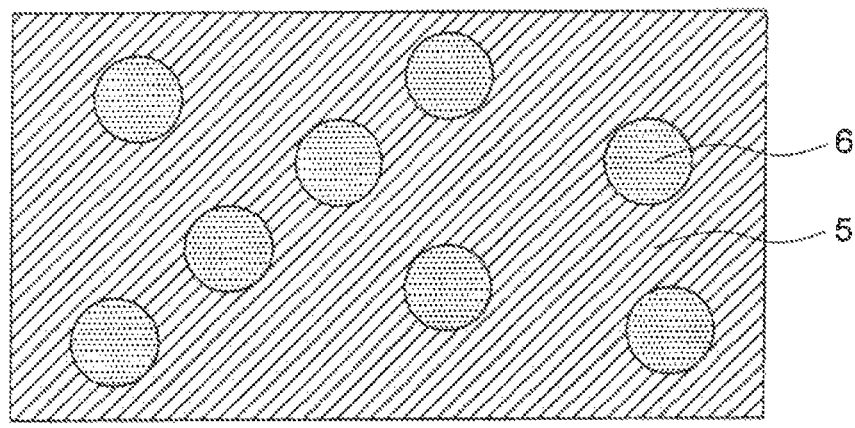
FIG. 2A is a schematic diagram showing the enlarged partial cross section of the cermet member constituting one embodiment of the present invention.

FIG. 2A is a schematic diagram wherein a cross section of the cermet member 3 of FIG. 1B is enlarged. The cermet member according to one embodiment of the present embodiment comprises a cermet oxide phase 5 and a cermet metal phase 6. Note that, the cermet oxide phase 5 may not be single phase, and plurality of oxide phases may co-exist. That is, plurality of compositional areas may be comprised.

The cermet oxide phase 5 of FIG. 2A may comprise the oxide including Fe or Ni, but preferably the main component is the Ni-based ferrite having a spinel structure. The Ni based ferrite has low solubility against the molten salt, hence when it is used as the electrode for the molten salt electrolysis, it shows good durability. Other oxide phase (for example NiO and $Fe_2O_3$ or so) may co-exist from the point of the sintering property with the cermet metal phase 6. The cermet metal phase 6 is Ni or an alloy including Ni. The cermet metal phase 6 functions to increase the conductivity of said cermet member 3.

Also, at least part of the cermet oxide phase 5 is preferably made from nickel ferrite from the point of the improvement of the conductivity and the corrosion resistance; and more preferably the cermet oxide phase 5 is mainly made of nickel ferrite.

What it means by "the cermet oxide phase 5 is mainly made of nickel ferrite" is that when the entire oxide of Ni in the cermet oxide phase 5 is 100 mass %, the content ratio of nickel ferrite is 70 mass % or more.

When the area of the cermet oxide phase 5 is $S_o$, the area of the cermet metal phase 6 is $S_m$, and the area ratio between the cermet oxide phase 5 and the cermet metal phase 6 is $S_o/S_m$, then $S_o/S_m$ preferably satisfies $60/40 \leq S_o/S_m \leq 90/10$. $S_o/S_m$ preferably satisfies the above mentioned range, because by covering the cermet metal phase 6 with the cermet oxide phase 5 in the cermet member 3, the cermet metal phase 5 can be prevented from dissolving into the molten salt (particularly of fluorides), and also the conductivity of the cermet member 3 can be improved.

The cermet metal phase 6 preferably includes at least one metal of Ni and Cu, and when the entire cermet metal phase 6 is 100 mass %, then preferably the content ratio of Ni is 20 to 90 mass %, and the content ratio of Cu is 10 to 80 mass %. The cermet metal phase 6 preferably has the above mentioned constitution because the corrosion resistance of the cermet member 3 can be improved.

Note that, the area ratio between the cermet oxide phase 5 and the cermet metal phase 6 is calculated by observing the cross section of the cermet member 3 using Backscattered Electron Image (BEI) of the electron microscope at the magnification of 300× to 1000×.

Figure 2B:
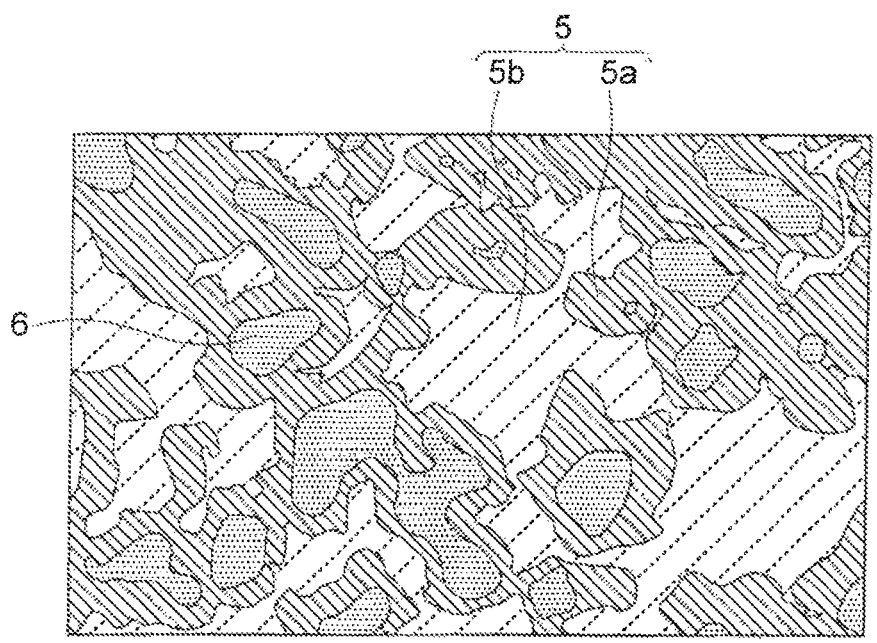
FIG. 2B is a schematic diagram showing the enlarged partial cross section of the cermet member constituting one embodiment of the present invention.

FIG. 2B is the schematic diagram wherein the schematic diagram of FIG. 2A is made closer to the actual cermet member 3. As shown in FIG. 2B, the cermet oxide phase 5 may comprise a spinel ferrite phase 5a and the nickel oxide phase 5b. The spinel oxide phase 5a comprises a spinel type crystal structure, and comprises the spinel ferrite expressed by the compositional formula $Ni_xFe_yM_zO_4$ (x+y+z=3, x≠0, y≠0, M is at least one selected from the group consisting of Al, Co, Cr, Mn, Ti, Zr, Sn, V, Nb, Ta, and Hf). The nickel oxide phase 5b comprises a nickel oxide expressed by a compositional formula of $Ni_{x'}Fe_{1-x'}O$ (x'≠0). Also, the cermet oxide phase 5 preferably comprises at least the spinel ferrite phase 5a.

The cermet metal phase 6 is dispersed in the cermet oxide phase 5, and it is preferably dispersed mainly in the spinel ferrite phase 5a. In other words, many cermet metal phases 6 are enclosed in the spinel ferrite phase 5a. Also, the cermet member 3 is a sintered body, thus it comprises small amount of pore (not shown in the figure) in the inside of the spinel ferrite phase 5, in the inside of the nickel oxide phase 5b, and/or at the boundary part of each phases.

When the entire cermet member 3 is 100 mass %, preferably the content ratio of the spinel ferrite phase 5a is 40 to 80 mass %, the content ratio of the nickel oxide phase 5b is 0 to 10 mass % (including 0 mass %), and the content ratio of the cermet metal phase 6 is 15 to 45 mass %. The content ratio of each phase is preferably within the above mentioned range, because this enables to minimize the dissolving of the cermet member 3 to the molten salt during the molten salt electrolysis, and also the electrolysis efficiency can be improved as the cermet member has conductivity.

The average composition of the entire spinel ferrite phase 5a included in the cermet member 3 is preferably within the range which is expressed by the compositional formula of $Ni_{x1}Fe_{y1}M_{z1}O_4$ (0.60≤x1≤0.90, 1.90≤y1≤2.40, 0.00≤z1≤0.20). The average composition of the spinel ferrite phase 5a is preferably within the above mentioned range, because this enables to attain good conductivity and good corrosion resistance.

The cermet member 3 preferably includes nickel oxide phase 5b, and the average composition of the entire nickel oxide phase 5b included in the cermet member 3 is more preferably expressed by the compositional formula of $Ni_{x'1}Fe_{1-x'1}O$ ($0.70 \leq x'1 \leq 1.00$). The average composition of the nickel oxide phase 5b is preferably within the above mentioned range from the point of a chemical balance with other phases (the spinel ferrite phase 5a and the cermet metal phase 6).

Figure 3:
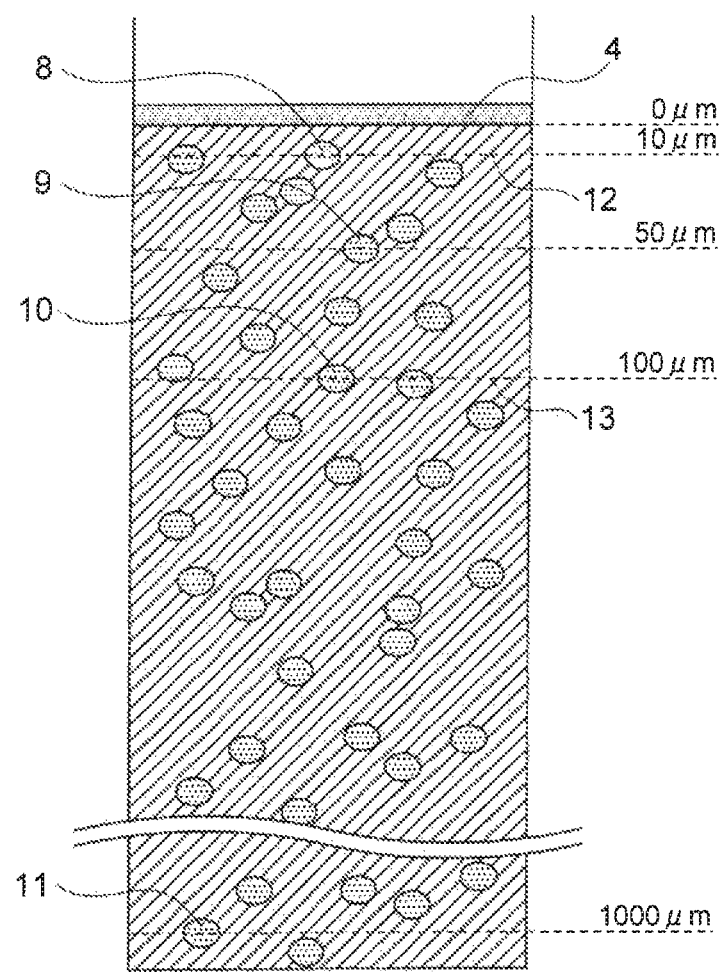
FIG. 3 is a schematic diagram showing a point of the cermet metal phase and the cermet oxide phase where SEM-EDS point analysis is carried out according to one embodiment of the present invention.

FIG. 3 is a schematic diagram near the boundary where the cermet member 3 and the metal member 1 are bonded. The present invention has focused on the cermet metal phases 8 to 11 in the cermet member 3 which are present at the positions away by 10 μm, 50 μm, 100 μm, and 1000 μm from the boundary between said cermet member 3 and said intermediate layer 4. Regarding the cermet metal phases 8 to 11 which are away from the boundary by certain distances respectively, the mass ratios of Cu with respect to entire cermet metal phase are defined as C10 (mass %), C50 (mass %), C100 (mass %) and C1000 (mass %). Similarly, regarding the cermet oxide phases 12 and 13, the cermet oxide phases 12 and 13 in the cermet member has been focused which are present at the positions away by 10 μm and 100 μm respectively from the boundary between the cermet member 3 and the intermediate layer 4. Regarding the cermet oxide phases 12 and 13 which are apart from the boundary by certain distances respectively, the mass ratios of Cu with respect to entire cermet metal phase are defined as M10 (mass %) and M100 (mass %).

In the present composite body, at the area near the boundary where the cermet member 3 and the metal member 1 are bonded, the cermet metal phases 8 to 11 and the cermet oxide phases 12 and 13 in the cermet member 3 have been focused, and the ratio of Cu in each phase satisfies the relation shown in the following equation 1 and equation 2. Also, in case the cermet oxide phases 12 and 13 comprise plurality of composition areas, any one of the phase may satisfy the equation 2.

$$C10 > C50 > C100 > C1000 \text{ (mass \%)}: \quad \text{(Equation 1)}$$

$$5 > M10 - M100 > -5 \text{ (mass \%)}: \quad \text{(Equation 2)}$$

The above mentioned equation 1 indicates that as moving away from the boundary, the mass ratio of Cu in the cermet metal phase 6 with respect to the entire cermet metal phase decreases stepwisely. This suggests that Cu is diffused to the cermet metal phase 6 from the intermediate layer 4. Also, the above mentioned equation 2 indicates that the mass ratio of Cu in the cermet oxide phase 5 is approximately constant regardless of the distance from the boundary. In other words, this means that the diffusion of Cu to the cermet oxide phase 5 from the intermediate layer 4 barely occurs.

The composite body of the present invention satisfies the above mentioned equation 1 and equation 2. The composite body of the present embodiment satisfying the above mentioned equation 1 and equation 2 has low occurrence of crack and has good bonding strength. The detailed mechanism is not clear, but as moving away from the boundary between the intermediate layer 4 and the cermet member 3 towards the cermet member 3 side, it is speculated that the thermal expansion coefficient of the cermet member 3 changes stepwisely while forming a gradient. Therefore, a local stress does not increase, and the residual stress is distributed by gradually decreasing. Thereby, it is speculated that the crack is suppressed, and a good bonding strength can be attained.

Next, the area near the boundary between the intermediate layer 4 and the cermet member 3 will be described. When the thermal expansion coefficient of Ni and the thermal expansion coefficient of Cu are compared, the thermal expansion coefficient of Cu is higher. Thus, if Cu is localized at the area near the boundary between the intermediate layer 4 and the cermet member 3, this could cause a crack due to the large thermal expansion difference.

However, in the composite body of the present embodiment, Cu is diffused to the cermet metal phase 6 of the cermet member 3, thus Cu does not localize to the area near the boundary between the intermediate layer 4 and the cermet member 3, and the thermal expansion difference between the cermet member 3 and the intermediate layer 4 at the area near the boundary between the intermediate layer 4 and the cermet member 3 is relieved.

As a result, the composite body having good bonding strength can be obtained. In the present embodiment, for example, when the bonding strength is evaluated by the four point bending test, the composite body having the bonding strength of 50 MPa or more can be obtained.

For the metal member 1 of FIG. 1B, the metal to be used is not particularly limited. For example, depending on the purpose of use, those used for a structure such as stainless steel or so may be selected. When used as the electrode, the metal member 1 in the composite body becomes part of the electric current path. If Ni or a Ni based alloy made of Ni, Cr, and Fe or so is selected when using for the molten salt electrolysis, the composite body electrode having high heat resistance and acid resistance, and low solubility to the molten salt can be formed.

The intermediate layer 4 of FIG. 1B is constituted from an alloy including Cu. As shown in FIG. 1A, the present intermediate layer 4 is formed by heat treating while the intermediate member 2 made of Cu or an alloy including Cu is placed between the metal member 1 and the cermet member 3. In the present embodiment, Cu is selectively diffused to the cermet metal phase 6 of the cermet member 3 from the intermediate layer 4. This is caused by Cu included in the intermediate member 2 diffusing to the cermet member 3 during the heat treatment for the bonding. Further, because Ni in the cermet member 3 is diffused to the intermediate member 2, preferably an alloy of Ni and Cu or mixture of Ni and Cu is used for the intermediate member 2. The mass ratio of Ni and Cu is not particularly limited as long as Cu is included. The bonding can be done by selecting an appropriate bonding temperature and appropriate sintering time.

For the intermediate layer 4 after the bonding, when the mass ratio between Ni and Cu is expressed in terms of percentage, preferably Ni is 10<Ni<70 (mass %) and Cu is 30<Cu<90 (mass %). By satisfying this condition, the diffusion of Cu from the intermediate layer 4 to the cermet metal phase 6 is effectively promoted, and even better bonding strength can be attained.

Figure 6:
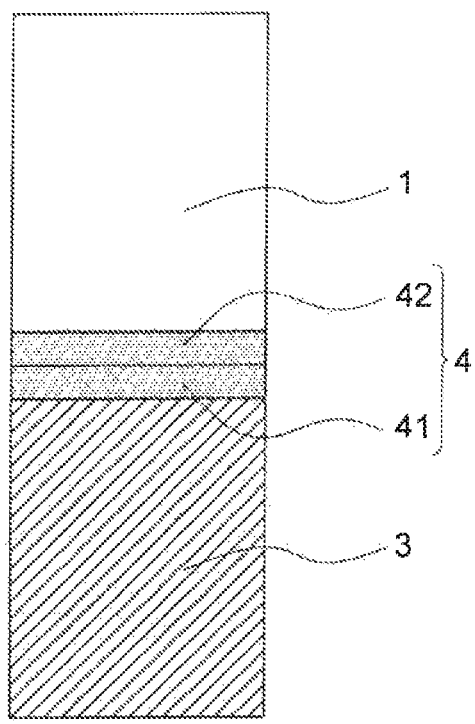
FIG. 6 is a schematic diagram of the cross section of the composite body according to one embodiment of the present invention.

Also, the intermediate layer 4 of the present embodiment may comprise two or more intermediate layers. That is, the intermediate layer 4 may be a multilayer structure having two or more layers. For example, as shown in FIG. 6, the intermediate layer 4 may be constituted from a first intermediate layer 41 and a second intermediate layer 42. Note that, in the present embodiment, from the intermediate layer closer to the cermet member 3, it is the first intermediate layer 41 and the second intermediate layer 42 respectively.

The method of determining the boundary between the cermet member 3 and the intermediate layer 4, the boundary between each intermediate layers and the boundary between the intermediate layer 4 and the metal member 1 will be described by referring to FIG. 8. Note that, in FIG. 8, the composite body shown in FIG. 6 is used as an example.

Figure 8:
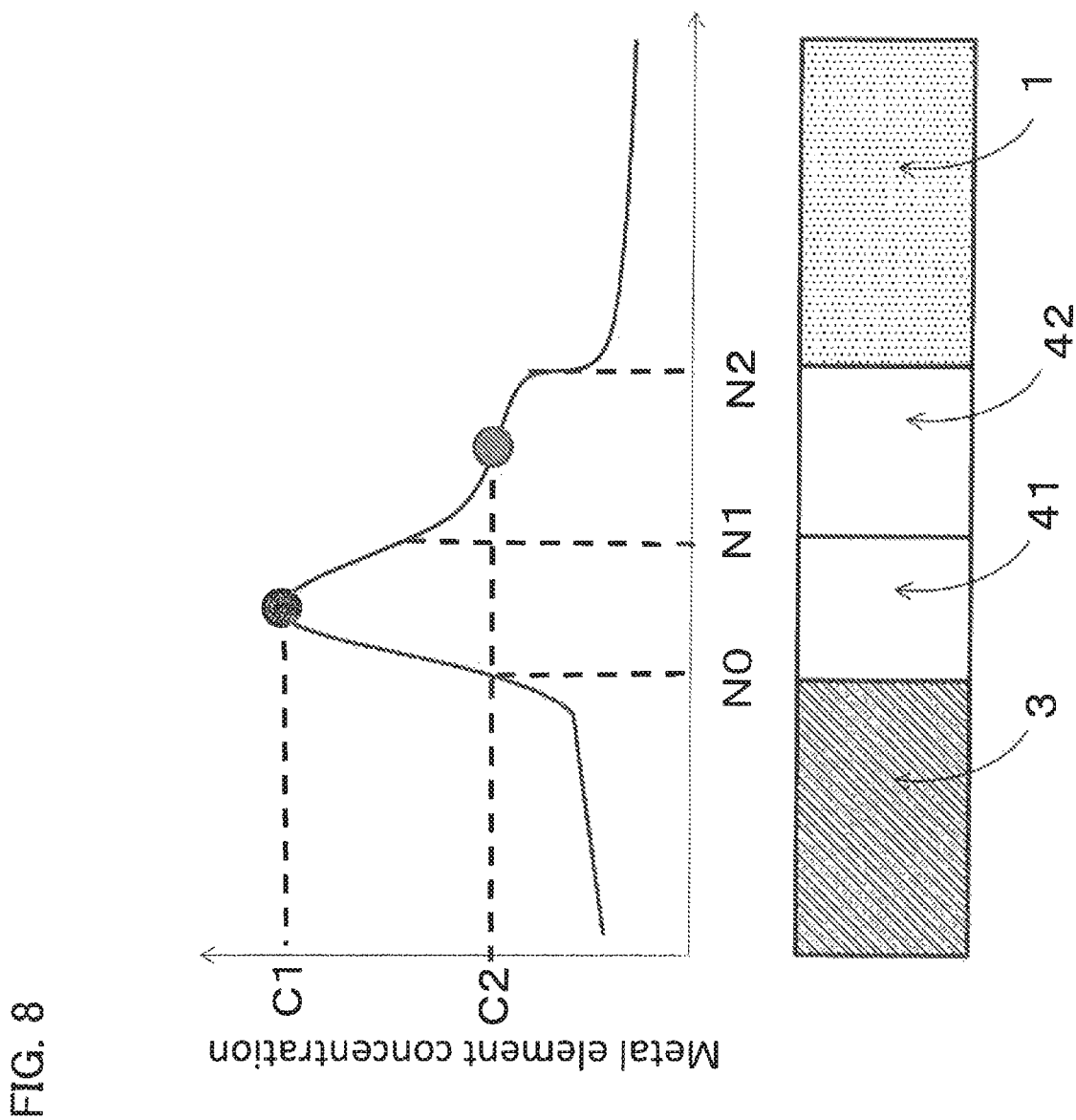
FIG. 8 is a schematic diagram of the result of the line analysis showing the method of determining the element concentration at each layer and at the boundary between each layer.

First, using EDS (Energy Dispersive Spectroscopy), a line analysis is carried out regarding the concentration of each metal element in the perpendicular direction with respect to the bonding face between the cermet member 3 and the intermediate layer 4 of the composite body; thereby a graph shown in FIG. 8 is obtained. Then, the boundary is defined as the position where the inflection point of the concentration curve is and the absolute value of the slope of the concentration curve is at maximum (in FIG. 8, N0, N1, and N2). In FIG. 8, N0 is the boundary between the cermet member 3 and the first intermediate layer 41, N1 is the boundary between the first intermediate layer 41 and the second intermediate layer 42, and N2 is the boundary between the second intermediate layer 42 and the metal member 1.

When a curve is expressed by the point (x,y) of the function of y=f(x), then the inflection point is the point where a second derivative f"(x) is 0 and a first derivative f'(x) takes a maximum value.

Also, the position of the boundary can be determined visually by mapping each element using EDS; and the position of the boundary determined by the above mentioned method using line analysis and the position of the boundary determined visually by mapping are substantially matched.

Next, the method of determining the concentration of each element in each intermediate layer will be discussed by referring to FIG. 8.

In case the maximum value or the minimum value of concentration of each element is present in said intermediate layer, then the concentration of each element in each intermediate layer is said maximum value or said minimum value. For example, the concentration of first intermediate layer 41 of FIG. 8 is the maximum value C1. Also, in case no maximum value and minimum value of the concentration of the element is present in said intermediate layer, the concentration of each element is the concentration at the middle point of the two boundaries. For example, the concentration of the second intermediate layer 42 of FIG. 8 is the concentration C2 at the middle point (not shown in the figure) between the boundary N1 of the first intermediate layer 41 and the second intermediate layer 42, and the boundary N2 of the second intermediate layer 42 and the metal member 1.

Here, the intermediate layer 4 may comprise at least two metals of Cu and M2. The type of M2 is not particularly limited, as long as the melting point of M2 is higher than that of Cu. Further, the first intermediate layer 41 may at least comprise Cu, and the second intermediate layer 42 may at least comprise M2. Further, the concentration of Cu is higher in the first intermediate layer 41 than in the second intermediate layer 42, and the concentration of M2 is preferably higher in the second intermediate layer 42 than in the first intermediate layer 41.

Figure 7:
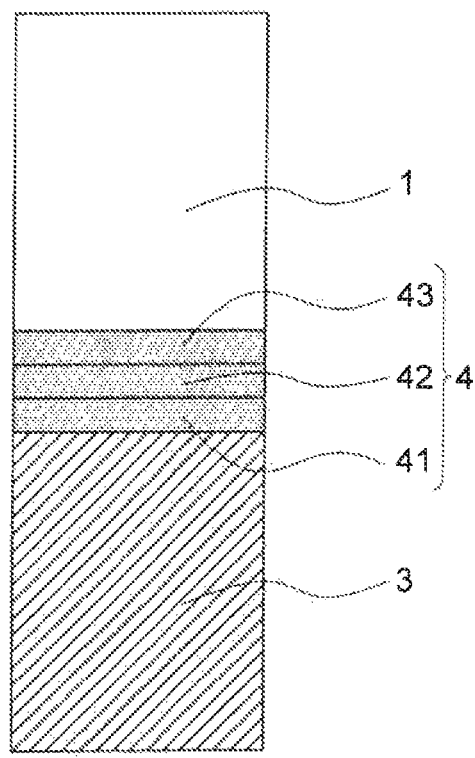
FIG. 7 is a schematic diagram of the cross section of the composite body according to one embodiment of the present invention.

FIG. 7 is the schematic diagram of the composite body wherein the intermediate layer 4 has three layers structure. The composite body shown in FIG. 7 has the third intermediate layer 43 between the second intermediate layer 42 and the metal member 1; and it is the same composite body as shown in FIG. 6 except that the second intermediate layer 42 and the metal member 1 are bonded.

The method of determining the boundary and the concentration of each element in the third intermediate layer 43 is as same as the method for determining the boundary and each element of the first intermediate layer 41 and the second intermediate layer 42 as discussed in the above.

For example, the third intermediate layer 43 may be constituted mainly by Cu and/or M2 as similar to the first intermediate layer 41 and the second intermediate layer 42, but the constitution is not limited thereto.

In case Cu and/or M2 is included in the third intermediate layer 43 as similar to the first intermediate layer 41 and the second intermediate layer 42, preferably the mass concentration of Cu in the third intermediate layer 43 is higher than that in the second intermediate layer 42, and preferably the mass concentration of M2 in the third intermediate layer 43 is lower than that in the second intermediate layer 42.

The intermediate layer 4 may be four layers structure or more. Also, in case the intermediate layer 4 has a multilayer structure, then the lower limit of the thickness of one intermediate layer is 10 μm. Further, the thickness per one intermediate layer is preferably 20 to 2000 μm, and the thickness of the intermediate layer 4 as a whole is preferably 20 to 3000 μm.

For the composite body shown in FIG. 6 and FIG. 7, Ni is preferably used as M2. The above mentioned constitution is preferable because this can improve the bonding strength between the cermet member 3 and the metal member 1.

Figure 9:
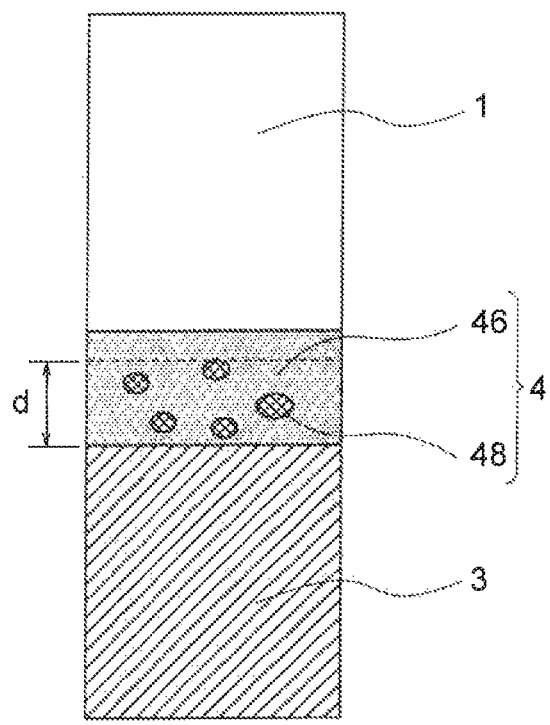
FIG. 9 is a schematic diagram of the cross section of the composite body according to one embodiment of the present invention.

Also, as shown in FIG. 9, the intermediate layer 4 according to the present embodiment bonds the cermet member 3 and the metal member 1, and also the intermediate layer 4 may comprise the intermediate metal phase 46 and the intermediate oxide phase 48.

The intermediate layer 4 of the composite body shown in FIG. 9 comprises the oxide of at least one metal; thereby the oxide can limit the void generated in the intermediate layer 4. In other words, in the intermediate layer 4 of the composite body, said intermediate oxide phase 48 comprising said oxide of metal limits the volume of void generated by a solidification shrinking of the metal. That is, by having the intermediate oxide phase 48 in the intermediate layer 4, the ratio of void present in the intermediate layer 4 can be significantly reduced.

The void can be a position where the stress concentrates in the intermediate layer 4, thus by reducing the amount of the void, it is thought that the bonding strength of the composite body can be increased. In the embodiment shown in FIG. 9, by decreasing the ratio of the void present in the intermediate layer 4, the crack is prevented from occurring in the composite body, and the bonding strength of the composite body can be improved significantly.

Among the oxide included in the intermediate oxide phase 48, preferably one or more of oxides are those included in the cermet oxide phase 5. Due to the above mentioned constitution, the degree of the thermal expansion of the intermediate layer 4 can be made closer to the degree of the thermal expansion of the cermet member 3. By making the degree of the thermal expansion of the intermediate layer 4 closer to the degree of the thermal expansion of the cermet member 3, the residual stress caused by the heat strain is decreased, and the crack can be prevented and also the bonding strength of the composite body can be improved.

For the type of the metal element constituting the intermediate metal phase 46, there is no limitation except that Cu is included as mentioned in the above. The intermediate metal phase 46 may be constituted only from Cu, and it may be constituted from plurality of metals including Cu. Note that, the intermediate metal phase 46 preferably includes more than one of Ni and Fe besides Cu.

At the cross section wherein the composite body is cut perpendicular with respect to the boundary between the cermet member 3 and the intermediate layer 4, the distance "d" is defined as the distance from the boundary between the cermet member 3 and the intermediate member 4 to the intermediate oxide phase 48 of the furthest positioned in the perpendicular direction. The measurement range is the range from said boundary to the distance "d". In case a total of an area occupied by the intermediate oxide phase 48 and an area occupied by the intermediate metal phase 46 in said measurement range is 100%, the area ratio occupied by the intermediate oxide phase 48 is preferably 10% to 50%.

As the area ratio occupied by the intermediate oxide phase 48 is 10% or more, the oxide of metal will sufficiently fill the void in the intermediate layer 4, and the crack can be prevented and also the bonding strength can be improved.

In the composite body shown in FIG. 9, the boundary between the cermet member 3 and the intermediate layer 4, and also the boundary between the intermediate layer 4 and the metal member 1 can be determined visually by observing said cross section using the optical microscope. Also, it can be determined by observing BEI (Backscattered Electron Image) obtained from the scanning electron microscope. Also, the intermediate oxide phase 48 in the intermediate layer 4 of BEI (Backscattered Electron Image) obtained from the scanning electron microscope is the gray color part.

Also, in the composite body shown in FIG. 9, the metal included in the intermediate layer 4 is further preferably constituted from Cu and Ni only. Also, the above mentioned constitution is preferable because the bonding strength between the cermet member 3 and the metal member 1 can be improved.

The Production Method of the Composite Body

Next, the preferable production method of the composite body according to the present embodiment will be explained, but the production method of the composite body according to the present invention is not limited to the following.

The production method of the cermet member 3 constituting the composite body of the present embodiment comprises; a mixing step for obtaining the mixed powder of the ferrite oxide powder and the metal powder, a molding step for obtaining the molded body by molding the mixed powder, and a sintering step to obtain the sintered body by sintering the molded body under predetermined atmosphere and temperature.

During the mixing step, the ferrite material powder comprising the predetermined mol ratio of the iron oxide (for example $Fe_2O_3$) and the oxide of metal (for example NiO) is prepared. Then, said ferrite material powder is calcined, and then pulverized to obtain the ferrite oxide powder.

In case the composite body according to the present embodiment is used for the electrode for the molten salt electrolysis, the cermet member obtained at the end comprises Ni, thereby the solubility with respect to the molten salt (particularly, fluorides) can be decreased compared to the case without Ni.

Also, the metal powder is prepared separately from said ferrite oxide powder. The type of said metal powder is not particularly limited as long as Ni is included. It may be a powder of single metal, for example it may be a powder of Ni metal alone, and it may be a powder of two or more metals, for example it may be a metal powder wherein Ni metal powder and Cu metal powder are mixed in a particular weight ratio. Further, an alloy powder obtained by melting the powder of two or more metals to form an alloy may be used as the metal powder.

Then, said ferrite oxide powder and said metal powder is mixed to obtain the mixed powder. The method of mixing said ferrite oxide powder and said metal powder is not particularly limited, and the usual mixing method by a ball mill or so can be used. Also, the mixing method may be a wet method or a dry method, and it may be a method which allows said ferrite oxide powder and said metal powder to be mixed uniformly.

The average primary particle diameter of the mixed powder obtained by the mixing step is not particularly limited, but usually the mixed powder having the average primary particle diameter of 1 to 30 μm is obtained.

During the molding step, the molded body is produced by molding said mixed powder. The molding method is not particularly limited, and for example the molded body can be produced by the usual dry molding which is generally used. In case of carrying out the usual dry molding, said mixed powder which has been added with a binder is filled into the usual metal mold, then press molding is carried out and the molded body is produced. The type of the binder is not particularly limited, and the binder used during the usual molding can be used. From the point of obtaining a good molding property, polyvinyl alcohol (PVA) as the binder is preferably used.

Note that, the molding method is not particularly limited to the dry molding, and it may be a wet molding wherein the slurry including the mixed powder and the solvent is pressure molded while removing the solvent, and also it may be other molding method.

The sintering step can be done under the atmosphere of active gas, but preferably it is carried out under inactive gas such as nitrogen gas or argon gas or so. By sintering the molded body under the inactive gas atmosphere, the oxidation of the metal powder is prevented, and nickel oxide is reduced and Ni is released, thus the alloying of the metal powder and Ni is facilitated. Further, due to the alloying of the metal powder and Ni, the conductivity of cermet member 3 can be prevented from decreasing.

The sintering temperature and the sintering time during the sintering step are not particularly limited, and these are appropriately regulated depending on the ferrite oxide powder and the metal powder used as the material. For example, the temperature is raised under the nitrogen gas or argon gas sintering atmosphere, and the sintering is carried out at the sintering temperature preferably of 1200 to 1450° C. and more preferably at 1300 to 1400° C., preferably for 1 to 10 hours and more preferably 2 to 6 hours; thereby the sintered body is obtained. By setting the sintering temperature within the above mentioned range, the nickel oxide phase in the cermet oxide phase 5 of the cermet member 3 can be decreased, and the conductivity of the cermet member 3 tends to improve.

Also, in case of considering the production cost and the heat resistance of the sintering facility, the sintering temperature is preferably 1450° C. or less.

Further, during the sintering step, the temperature increasing rate is preferably 30 to 500° C./hour, and more preferably 50 to 350° C./hour. By making the temperature increasing rate to 500° C./hour or less, the density of the cermet member 3 can be prevented from decreasing. Also, by setting the temperature increasing rate to 30° C./hour or more, the production cost of the cermet member 3 can be reduced.

Also, the temperature decreasing rate during the sintering step is preferably 10 to 500° C./hour, and more preferably 30 to 350° C./hour. By making the temperature decreasing rate to 500° C./hour or less, the density of the cermet member 3 can be prevented from decreasing. Also, by setting the temperature decreasing rate to 30° C./hour or more, the production cost of the cermet member 3 can be reduced.

The sintered body obtained by the sintering step may be used as the cermet member 3 without any processing, or it may be used as the cermet member 3 having the desired shape by carrying out some processing.

For the metal member 1, the metal used is not particularly limited. For example, those used for structure such as stainless steel or so may be selected. In case of using the composite body according to the present embodiment for the electrode for the molten salt electrolysis, if Ni based alloy such as Ni—Fe alloy is selected as the material of the metal member 1, then the heat resistance and the acid resistance are high and the solubility towards the molten salt (particularly, fluorides) is low, thus it is preferable. Also, the cermet member 3 loses iron during the electrolysis and then iron in the metal phase is supplied, thus the metal member 1 preferably includes iron. Due to the presence of Ni in the intermediate member 2, the movement of iron from the metal member 1 to the cermet member 3 can be regulated advantageously. Also, it can be selected from the commercially available alloy which includes elements.

Next, the preparation method of the intermediate layer 4 included in the composite body will be explained. Hereinafter, the step of integrally forming the cermet member 3 and the metal member 1 will be referred as the heat treating step.

As the metal constituting the intermediate member 2 of the present embodiment, Cu is preferably selected which is the metal melted when carrying out the heat treatment during the bonding. Further, as long as Cu is included, other metal may be further included as well. For example, the metal which melts at relatively low temperature such as an alloy of Cu and Ni may be selected.

As the intermediate member 2 of the present embodiment, Cu powder only may be used, or alloy of Ni and Cu, or a mixture of Ni powder and Cu powder may be used. Also, the shape is not particularly limited, such as the molded body of powder, foil, plate or so may be mentioned. As discussed in above, for the intermediate member 2, the mass ratio between Ni and Cu are not particularly limited as long as Cu is included. Regardless of the composition of the intermediate member 2, the bonding can be done by selecting the appropriate sintering temperature and sintering time. Here, in case of using the powder of metal for the intermediate member 2, the molded body may be formed by applying a pressure. At this time, the pressure molding is carried out so that the thickness is 0.01 to 0.1 cm, preferably 0.015 to 0.025 cm. By satisfying this condition, a good intermediate layer 4 can be supplied during the heat treatment of the cermet member 3 and the metal member 1. Regarding the thickness, if it is less than 0.01 cm, then the amount of the intermediate member 2 forming the intermediate layer 4 will be short, and a sufficient bonding strength cannot be obtained; and if it exceeds 0.1 cm, the deformation during the sintering of the intermediate layer 4 can't be ignored. Regarding the molding pressure, it is 140 MPa or more, and preferably 200 MPa or more. If the molding pressure is lower than 140 MPa, the pressure is not sufficient and the mixed molded body cannot have a suitable thickness.

The intermediate member 2 is placed between the cermet member 3 and the metal member 1, and the preparation for the heat treating step is done.

Also, as shown in FIG. 6, the composite body comprising the intermediate layer 4 which comprises plurality of intermediate layers (the first intermediate layer 41 and the second intermediate layer 42) can be obtained for example by using the method wherein the plurality of intermediate members are inserted between the cermet member 3 and the metal member 1 then applying a heat while applying pressure.

Hereinafter, the plurality of intermediate members will be referred respectively as the first intermediate member and the second intermediate member from the cermet member 3 towards the metal member 1. The first intermediate member at least includes Cu, and the second intermediate member at least includes the second metal M2.

The type of the second metal M2 is not particularly limited, but preferably the melting point of M2 is higher than Cu. Further, the heat applying temperature during the bonding step is preferably higher than the melting point of Cu and lower than the melting point of M2. By applying a heat at the temperature higher than Cu, the first intermediate member melts, and the liquid phase diffusion bonding can be carried out to the cermet member 3 and the second intermediate member 2; and the bonding strength can be improved compared to the case of which the first intermediate member contacting the cermet member 3 does not melt. Further, by applying the heat at the temperature lower than the melting point of M2, the second intermediate member does not melt, and the reaction can be suppressed so that the metal in the cermet member 3 does not diffuse to the metal member 1 by passing through the first intermediate member and the second intermediate member. In order to melt only the first intermediate member, the Cu concentration of the first intermediate member is higher than the Cu concentration of second intermediate member, and the M2 concentration of the second intermediate member is higher than the M2 concentration of the first intermediate member.

The first intermediate member has the higher Cu concentration than the Cu concentration in the second intermediate member; thereby the Cu concentration of the first intermediate layer 41 is higher than the Cu concentration in the second intermediate layer for the composite body shown in FIG. 6. Also, the second intermediate member has higher M2 concentration than that in the first intermediate member; thereby the M2 concentration of the second intermediate layer 42 is higher than the M2 concentration of the first intermediate layer 41.

In case of above, because of the second intermediate member which does not melt by a heat application, the cermet metal phase 6 in the cermet member 3 is blocked by the second intermediate member, and a diffusion is barely made to the metal member 1. Therefore, the increase of void and the generation of crack at the area near the boundary between the cermet member 3 and the intermediate layer 4 can be prevented.

As discussed in above, due to the constitution of using the above mentioned plurality of intermediate members, the void is barely generated at the area near the boundary between the cermet member 3 and the intermediate layer 4, and the bonding strength tends to easily improve.

Note that, the melting point of the first metal Cu is 1083° C. Further, the second metal M2 is preferably Ni (the melting point is 1455° C.).

Further, because the metal member 1 includes Ni as discussed in above, Ni and Cu components in the intermediate layer 4, particularly Ni and Cu components in the second intermediate layer 42 which is in contact with the metal member 1 diffuses to the metal member 1, thus the bonding strength increases.

For the composite body shown in FIG. 6, when the total weight of Ni and Cu in the first intermediate layer 41 is defined as 100, then the amount of Ni is preferably 10 to 60, and the amount of Cu is preferably 90 to 40; and when the total weight of Ni and Cu in the second intermediate layer 42 is defined as 100, then the amount of Ni is preferably 100 to 70, and the amount of Cu is preferably 0 to 30, from the point of improving the bonding strength.

Further, the composite body shown in FIG. 7 can be formed by increasing the number of the intermediate members to 3. Here, the intermediate member closest to the metal member 1 is defined as the third intermediate member.

In the third intermediate member, at least the first metal Cu is preferably included. Also, preferably the Cu concentration of the third intermediate member is higher than the Cu concentration of the second intermediate member, and the M2 concentration of the second intermediate member is preferably higher than the M2 concentration of the third intermediate member.

Due to the above discussed constitution, the third intermediate member melts by applying a heat at a temperature higher than the melting point of Cu but lower than the melting point of M2; thereby the liquid phase diffusion bonding between the second intermediate member and the metal member 1 is carried out.

For the embodiment which uses two intermediate members which are the first intermediate member and the second intermediate member, the second intermediate member which is in contact with the metal member 1 does not melt, hence the metal member 1 and the second intermediate member are bonded by the solid phase diffusion bonding. On the contrary, the embodiment using three intermediate members which are the first intermediate member, the second intermediate member and the third intermediate member, the metal member 50 and the third intermediate member are bonded by the liquid phase diffusion bonding. That is, when melting the first intermediate member, the third intermediate member also melts and can carry out the liquid phase diffusion bonding, and a good liquid phase diffusion reaction is exhibited to the second intermediate member and the metal member 1, thereby the bonding strength improves.

Therefore, when using the third intermediate member, the void formed between the second intermediate layer 42 and the metal member 1 can be decreased in the composite body obtained at the end. By decreasing the void, when using the composite body according to the present embodiment as the electrode for the electrolysis, the uniform and high current density distribution can be obtained.

In regards with the embodiment of providing the third intermediate layer 43 using the third intermediate member, when the total weight of Ni and Cu of the first intermediate layer 41 and/or the third intermediate layer 43 is defined as 100, the amount of Ni in said intermediate layer is preferably 10 to 60, and the amount of Cu is preferably 90 to 40.

Hereinafter, the preparation method of intermediate layer 4 in the composite body shown in FIG. 9 will be explained.

As the metal constituting the intermediate member 4 in the composite body shown in FIG. 9, the metal which melts during the heat treatment of bonding is preferably selected. For example, the metal which melts at relatively low temperature such as the alloy of Cu and Ni or so is preferably selected.

As the oxide constituting the intermediate layer 4 of the composite body shown in FIG. 9, preferably the oxide which is entirely or partly common with the oxide constituting said cermet member 3 is used. For example, if the oxide included in the cermet member 3 is constituted by the mixture of Ni based ferrite and NiO, then as the oxide constituting the intermediate layer 4, Ni based ferrite and/or NiO is preferably included.

Said metal and said oxide constituting the intermediate layer 4 are thoroughly mixed while in powder state prior to the heat treatment. The mixing ratio is preferably metal: oxide=95:5 to 65:35, and more preferably 90:10 to 65:35 in terms of mass. By satisfying the above mentioned mixing ratio, in case the total of the area occupied by said intermediate oxide phase 48 and the area occupied by said intermediate metal phase 46 in said intermediate layer 4 is defined as 100%, then the area ratio occupied by said intermediate oxide phase 48 is 10% to 50%.

By setting the area ratio occupied by said intermediate oxide phase 48 to 10% to 50%, the rate of void generation in said intermediate layer can be easily suppressed, and the bonding strength in the composite body is enhanced.

In the present embodiment, the method wherein the powder of after the mixing is applied with pressure to form a molded body as the intermediate member 2 will be explained; however the intermediate member 2 is not limited to the molded body. For example, the intermediate member 2 may be formed from the paste wherein the powder of after the mixing is made into a paste using the organic solvent.

The powder of after the mixing is pressure molded so that the thickness is preferably 0.01 to 0.1 cm, and more preferably 0.015 to 0.025 cm. By setting the thickness after the molding within the above mentioned range, a sufficient amount of the intermediate layer 4 can be provided during the heat treating step, and the bonding strength of the composite body obtained at the end is enhanced, furthermore the degree of deformation of the intermediate layer 4 during the heat treating step can be suppressed to the level that can be ignored. Regarding the molding pressure, it is preferably 140 MPa or more, and more preferably 200 MPa or more. By setting the molding pressure within the above mentioned range, the molded body can easily have a suitable thickness.

Said molded body is used as the intermediate member 2, and placed between the cermet member 3 and the metal member 1, thereby the preparation for the heat treating step is completed.

The heat treating step is the step for carrying out the heat treatment by placing the intermediate member 2 between the cermet member 3 and the selected metal member 1 obtained by the above mentioned step. The heat treating step is carried out under the vacuumed atmosphere or the inactive gas atmosphere such as nitrogen gas or argon gas. By sintering under the inactive gas atmosphere or the vacuumed atmosphere, the metal member 1 can be prevented from being oxidized.

When bonding the metal member 1 and the cermet member 3, for the heat treatment temperature, the temperature which allows sufficient diffusion may be selected. Also, the heat treatment may be carried out while applying appropriate pressure. If the heat treatment temperature is limited due to the heat resistance of the metal member 1 and the cermet member 3, the heat treatment time may be increased, thereby the diffusion satisfying the aforementioned equation 1 may be promoted. Thus, the heat treatment temperature and the heat treatment time are not particularly limited in the present embodiment, and these can be regulated appropriately depending on the heat resistance of the used metal member 1 and the cermet member 3.

However, as the realistic limitation, from the point of reducing the production cost and the heat treatment temperature of the cermet member 3, the heat treatment temperature is preferably 1450° C. or less, and more preferably 1300° C. or less. If the heat treatment temperature is too low, the heat treatment time will be too long, and it may exceed 100 hours. Therefore, the heat treatment temperature is 1050° C. to 1300° C., and the heat treatment time is preferably 0.1 to 100 hours, more preferably 1 to 75 hours, thereby the composite body is obtained.

The temperature increasing rate during the heat treatment is 30 to 600° C./h, and preferably 50 to 350° C./h. In case the temperature increasing rate is faster than this condition, a sufficient bonding is not done, and the bonding strength tends to decrease. If the temperature increasing rate is slower than this condition, the production cost increases. Also, in regards with the temperature decreasing rate, it is 10 to 600° C./h, and preferably 30 to 350° C./h. In case the temperature decreasing rate is faster than this condition, numerous cracks tend to occur, and in case it is slower, the production cost increases.

By going through the above step, the composite body comprising the intermediate layer 4 between the cermet member 3 and the metal member 1 is obtained.

The obtained composite body may be used as it is, or it may be processed depending on the purpose of use. Also, the purpose of use of the obtained composite body is not particularly limited, but it is suitable as the electrode for the electrolysis.

For the composite body obtained in the above mentioned step, the cross section is observed, and the compositional analysis and the strength measurement by the four point bending test are carried out to the cermet metal phase 6 and the cermet oxide phase 5 in the cermet member 3.

The obtained composite body is cut so that the part where the cermet member 3 and the metal member 1 are bonded via the intermediate layer 4 can be seen, then the cross section is exposed. After mirror polishing the cross section, the optical microscope is used to observe the metal member 1, the cermet member 3, the intermediate layer 4 and the crack.

Next, the void analysis is carried out to the cross section image observed by the optical microscope. Here, the black color part confirmed in the intermediate layer 4 is determined as the void, and then the ratio thereof is calculated. To the intermediate layer 4 of the obtained composite body, the line analysis is carried out at the position where the maximum void is calculated. The length of line is 3 mm, and the ratio of the void occupying the whole line is calculated. The same measurement is carried out to 10 samples, then the average value thereof is calculated, and the void ratio is obtained. Also, for example if a straight line of about 3 mm line cannot be drawn, then the number of samples to be measured are increased so that the total measured range is 30 mm (for example, if the length which can be measured is 1.5 mm, then 20 lines are measured), thereby the void ratio is calculated.

In the present embodiment, if the ratio of void in the intermediate layer 4 is less than 5%, then it is determined as a good composite body.

Next, the composition analysis of the cermet metal phase 6 in the cermet member 3 is carried out by the point analysis using SEM-EDS. The composition analysis of the cermet metal phases 8 to 11 of FIG. 3 which are present at the position away by 10, 50, 100, and 1000 μm in perpendicular direction from the boundary between the intermediate layer 4 and the cermet member 3 are carried out. Using the result of the composition analysis, the mass ratio of Cu with respect to the element constituting the cermet metal phase in each of the cermet metal phases 8 to 11 are calculated. The calculated values are respectively defined as C10, C50, C100 and C1000 (mass %) in relation with the distance from the boundary between the intermediate layer 4 and the cermet member 3.

Further, the compositional analysis of the cermet oxide phases 12 and 13 were carried out by the point analysis using SEM-EDS. The composition analysis of the cermet oxide phases 12 and 13 of FIG. 3 which are present at the position away by 10 and 100 μm in perpendicular direction from the boundary between the intermediate layer 4 and the cermet member 3 are carried out. Using the result of the composition analysis, the mass ratio of Cu with respect to the element constituting the cermet oxide phase in each of the cermet oxide phases 12 and 13 are calculated. The calculated values are defined as M10 and M100 (mass %) respectively in relation with the distance from the boundary between the intermediate layer 4 and the cermet member 3.

Figure 4:
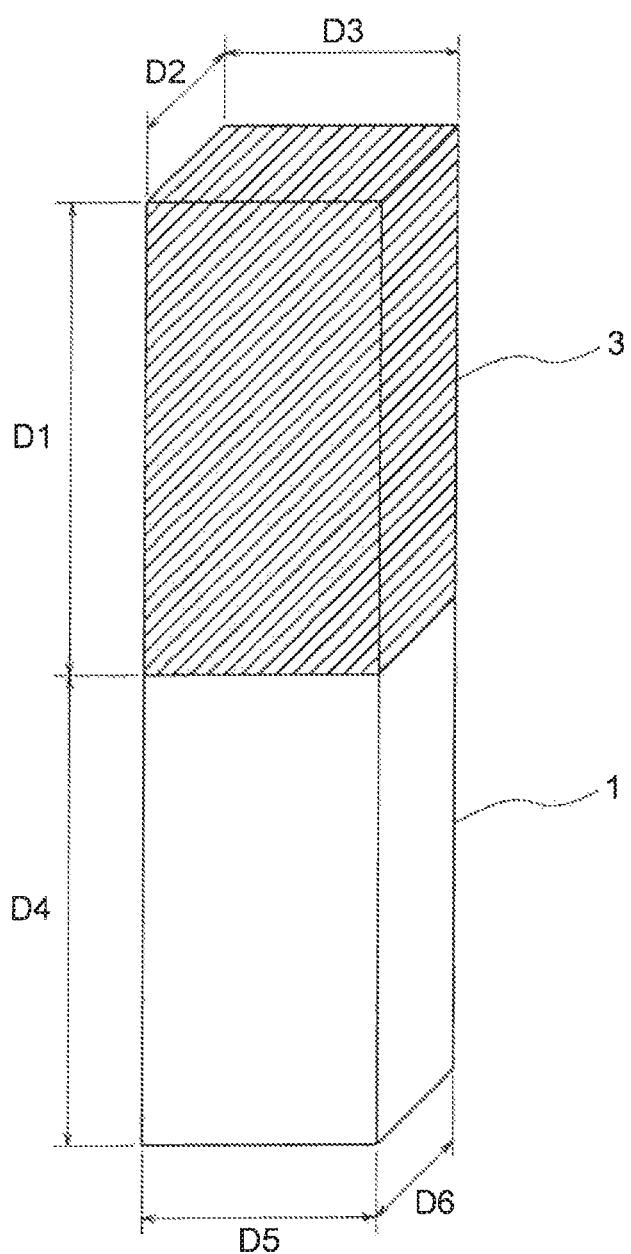
FIG. 4 is a schematic diagram showing the shape of the sample used for the strength measurement by a four point bending test.

Next, each composite body sample is processed as shown in FIG. 4. The four point bending test is carried out to the processed sample and the bonding strength is evaluated. As shown in FIG. 4, the metal member 1 and the cermet member 3 are processed so to satisfy D1=D4=2.0 cm, D2=D6=0.3 cm, D3=D5=0.4 cm.

Twenty of the above mentioned samples are produced and the four point bending test is carried out. The average value of 20 samples is defined as the bonding strength.

Hereinabove, a preferable embodiment of the present invention has been described; however the present invention is not to be limited thereto. Also, the cermet member 3 may include different phase other than the cermet oxide phase 5 and the cermet metal phase 6. Also, the material of the metal member 1 is not particularly limited. From the point of further increasing the bonding strength, the diffusion bonding method may be applied which uses the help of the mechanical pressure. Also, the cermet member 3 may physically stack plurality of cermet member having a different metal composition so that it satisfies the aforementioned equation 1.

EXAMPLE

Herein after, the present invention will be described in further detail using the examples and the comparative examples; however the present invention is not to be limited thereto.

Experiment 1

Examples 1 to 45 and Comparative Examples 1 to 24

Commercially available NiO powder and $Fe_2O_3$ powder were blended so that the mol ratio between NiO and $Fe_2O_3$ satisfied 70:30, then mixed using a ball mill. The mixed powder obtained by mixing was calcined at 1000° C. for 3 hours in atmosphere. The calcined powder obtained by calcining was pulverized by a ball mill; thereby the ferrite oxide powder was prepared.

The obtained ferrite oxide powder and metal powder were mixed. Here, as the metal powder; Ni powder; the mixed powder of Ni powder and Cu powder; the mixed powder of Ni powder and Ag powder; and the mixed powder of Ni powder, Cu powder and Ag powder were prepared. As the mixed powder of Ni powder and Cu powder, the mixing ratio satisfied the mass ratio of Ni and Cu of 45<Ni<100 (mass %), 0<Cu<55 (mass %). The mixing ratio of Ni powder and Ag powder was Ni=98 (mass %), and Ag=2 (mass %). For the mixing ratio of Ni powder, Cu powder and Ag powder, the mixing ratio satisfied the mass ratio of Ni, Cu and Ag of 49<Ni<98 (mass %), 0<Cu<49 (mass %), and Ag=2 (mass %). Also, these were blended so that the mass ratio of said ferrite oxide and said metal powder satisfied 83:17 (mass %). The blended powder was mixed using a ball mill, then 0.8 mass % of binder (PVA) was added to the obtained mixed powder. Then, these were mixed in the ball mill thereby the mixed powder was obtained.

The obtained mixed powder was press molded to obtain the molded body having a rectangular parallelepiped shape. This molded body was sintered in the nitrogen gas atmosphere at the temperature of 1300° C. for 3 hours, then gradually cooled in the nitrogen gas, thereby the sintered body as the cermet member was obtained. One of the obtained sintered body was cut; then using the backscattered electron image (BEI) by the electron microscope (S-2100 made by Hitachi High-Technologies Corporation), random 30 fields of visions of the cross sections were observed at 500× magnification, thereby the area ratio between the cermet oxide phase and the cermet metal phase (So/Sm) was calculated.

The sintered body (the cermet member) obtained as mentioned in the above was processed into a size of 1.5 cm×1.5 cm×2.0 cm, and the metal members were prepared having a composition of (Ni 100 mass %), (Ni 72 mass %, Cr 17 mass % and Fe 10 mass %), (Ni 63 mass %, Cr 25 mass %, Fe 11 mass % and Al 1 mass %), (Ni 65 mass %, Cu 33 mass % and Fe 2 mass %), (Ni 10 mass %, Cr 20 mass %, and Fe 70 mass %), and (Fe 88 mass %, Cr 11 mass %, Si 1 mass %) were processed into a size of 1.5 cm×1.5 cm×2.0 cm.

A mirror polishing was carried out to the face of 1.5 cm×1.5 cm of the cermet member and the metal member obtained by the above mentioned method, and the mirror treated face was used as the bonding face.

Next, the intermediate member was prepared. As the intermediate member, the mixed molded body was selected. The mixed powder was prepared so that the mixing ratio satisfied the mass ratio of Ni and Cu of Ni=5 (mass %) and Cu=95 (mass %). The obtained mixed powder was applied with the pressure of 195 MPa so that the thickness was 0.02 cm; thereby the mixed molded body was produced.

Next, the mixed molded body having a thickness of 0.02 cm was placed on the cermet member, and the metal member was placed on the mixed molded body. Here, the mixed molded body was placed between the cermet member and the metal member so that the mixed molded body was in contact with the mirror treated faces of the cermet member and the metal member.

Then, the heat treatment was carried out at the sintering temperature of 900 to 1450° C.; thereby the composite body was obtained. The temperature increasing rate and the temperature decreasing rate were 300° C./h, and the holding time was 0.1 to 100 hours.

Next, to the obtained composite body, the cross section was exposed by cutting at a plane perpendicular to the face carried out with the mirror polishing of the cermet member. The cross section was observed for the crack using the optical microscope. Next, the line analysis was carried out for the void analysis in the intermediate layer. The line analysis was done so that the total measured range was 30 mm, and the void ratio of the intermediate layer was defined. In the column "crack" shown in Table 1, the presence of the crack is indicated. Further, in the column "void" shown in Table 1, the void ratio less than 5% in the intermediate layer is indicated "○", 5% or more to less than 10% is indicated "Δ", and 10% or more is indicated "x".

The metal composition of the intermediate layer in the obtained composite body was measured. The metal composition of the intermediate layer was measured using EDS. Table 1 only shows Ni and Cu.

Next, to the obtained composite body, the composition analysis was carried out to the intermediate layer and the cermet member. For the present example, the composition analysis was carried out for the cermet metal phase present at the positions away by 10, 50, 100, 1000 μm in the perpendicular direction from the boundary between the intermediate layer and the cermet member. Using the result of the composition analysis, the mass ratio of Cu in each cermet metal phase was calculated with respect to the entire metal phase; then the calculated values were defined as C10, C50, C100, C1000 (mass %) respectively in relation with the distance from the boundary between the intermediate layer and the cermet member. Also, the composition analysis was similarly carried out for the cermet oxide phase present at the positions apart by 10 and 100 μm in the perpendicular direction from the boundary between the intermediate layer and the cermet member. Using the result of the composition analysis, the mass ratio of Cu in each cermet oxide phase was calculated with respect to the entire oxide phase; then the calculated values were defined as M10 and M100 (mass %) respectively in relation with the distance from the boundary between the intermediate layer and the cermet member. The obtained result is shown in Table 2.

Figure 10:
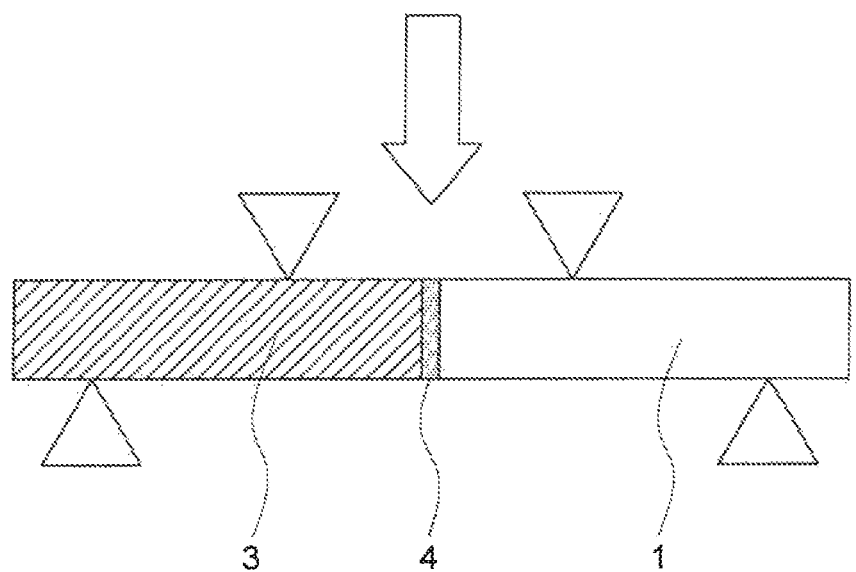
FIG. 10 is a schematic diagram showing the condition of carrying out the strength measurement by the four point bending test.

Also, regarding the obtained composite body, 20 samples were prepared by processing into a size of 0.4 cm×0.3 cm×2.0 cm as shown in FIG. 4. The four point bending test was carried out to each sample. The average value obtained from the four point bending test was evaluated as the bonding strength. The four point bending test was carried out by the method shown in the schematic figure of FIG. 10. Note that, as the four point bending test device, Model 1311-D made by AIKOH ENGINEERING CO., LTD was used. In the present example, the bonding strength of 50 MPa or more was evaluated as a good bonding strength. The results are shown in Table 2.

TABLE 1

| Sample No. | Composition of metal member before bonding So/Sm | | Composition of cermet metal phase before bonding (mass %) | Composition of intermediate member before bonding (mass %) | Bonding temperature (° C.) | Bonding time (h) | Crack | Intermediate layer | | |
|---|---|---|---|---|---|---|---|---|---|---|
| | | (mass %) | | | | | | Void | Ni | Cu |
| Example 1 | 83/17 | Ni100 | Ni100 | Cu95Ni5 | 1425 | 3 | | ○ | 71.1 | 28.9 |
| Example 2 | 83/17 | Ni100 | Ni100 | Cu95Ni5 | 1400 | 3 | | ○ | 69.8 | 30.2 |
| Example 3 | 83/17 | Ni100 | Ni100 | Cu95Ni5 | 1350 | 3 | | ○ | 66.3 | 33.7 |
| Example 4 | 83/17 | Ni100 | Ni100 | Cu95Ni5 | 1300 | 3 | | ○ | 60.4 | 39.6 |
| Example 5 | 83/17 | Ni100 | Ni100 | Cu95Ni5 | 1250 | 3 | | ○ | 50.7 | 49.3 |
| Example 6 | 83/17 | Ni100 | Ni100 | Cu95Ni5 | 1200 | 3 | | ○ | 37.5 | 62.5 |
| Example 7 | 83/17 | Ni100 | Ni100 | Cu95Ni5 | 1150 | 3 | | ○ | 11.5 | 88.5 |
| Example 8 | 83/17 | Ni100 | Ni100 | Cu95Ni5 | 1100 | 3 | | ○ | 10.7 | 89.3 |
| Example 9 | 83/17 | Ni100 | Ni100 | Cu95Ni5 | 1085 | 3 | | ○ | 1.1 | 98.9 |

TABLE 1-continued

| Sample No. | Composition of metal member before bonding So/Sm (mass %) | Composition of cermet metal phase before bonding (mass %) | Composition of intermediate member before bonding (mass %) | Bonding temperature (° C.) | Bonding time (h) | Crack | Void | Intermediate layer Ni | Cu |
|---|---|---|---|---|---|---|---|---|---|
| Comparative example 1 | 83/17 | Ni100 | Ni100 | Cu95Ni5 | 1070 | 3 | | ○ | 6.3 | 93.7 |
| Example 10 | 83/17 | Ni100 | Ni100 | Cu95Ni5 | 1070 | 15 | | ○ | 7.6 | 92.4 |
| Comparative example 2 | 83/17 | Ni100 | Ni100 | Cu95Ni5 | 1050 | 3 | | ○ | 5.9 | 94.1 |
| Comparative example 3 | 83/17 | Ni100 | Ni100 | Cu95Ni5 | 1050 | 15 | | ○ | 6.9 | 93.1 |
| Example 11 | 83/17 | Ni100 | Ni100 | Cu95Ni5 | 1050 | 30 | | ○ | 5.5 | 94.5 |
| Comparative example 4 | 83/17 | Ni100 | Ni100 | Cu95Ni5 | 1030 | 3 | | Δ | 5.6 | 94.4 |
| Comparative example 5 | 83/17 | Ni100 | Ni100 | Cu95Ni5 | 1000 | 3 | | Δ | 2.6 | 97.4 |
| Comparative example 6 | 83/17 | Ni100 | Ni100 | Cu95Ni5 | 950 | 3 | Present | X | 1.3 | 98.7 |
| Comparative example 7 | 83/17 | Ni100 | Ni100 | Cu95Ni5 | 900 | 3 | Present | X | 1.1 | 98.9 |
| Comparative example 8 | 83/17 | Ni100 | Ni100 | Cu95Ni5 | 1300 | 0.1 | Present | X | 52.5 | 34.7 |
| Example 12 | 83/17 | Ni100 | Ni100 | Cu95Ni5 | 1300 | 1 | | ○ | 54.2 | 34.7 |
| Example 13 | 83/17 | Ni100 | Ni100 | Cu95Ni5 | 1300 | 15 | | ○ | 65.3 | 34.7 |
| Example 14 | 83/17 | Ni100 | Ni100 | Cu95Ni5 | 1300 | 75 | | ○ | 69.9 | 30.1 |
| Comparative example 9 | 83/17 | Ni100 | Ni100 | Cu95Ni5 | 1300 | 80 | Present | X | 72.8 | 27.2 |
| Comparative example 10 | 83/17 | Ni100 | Ni100 | Cu95Ni5 | 1300 | 100 | Present | X | 74.4 | 25.6 |
| Example 15 | 83/17 | Ni72Cr17Fe10 | Ni100 | Cu95Ni5 | 1300 | 3 | | ○ | 59.8 | 40.2 |
| Comparative example 11 | 83/17 | Ni72Cr17Fe10 | Ni100 | Cu95Ni5 | 1070 | 3 | | ○ | 8.3 | 93.7 |
| Example 16 | 83/17 | Ni72Cr17Fe10 | Ni100 | Cu95Ni5 | 1070 | 15 | | ○ | 7.8 | 92.4 |
| Example 17 | 83/17 | Ni63Cr25Fe11Al1 | Ni100 | Cu95Ni5 | 1300 | 3 | | ○ | 56.9 | 43.1 |
| Comparative example 12 | 83/17 | Ni63Cr25Fe11Al1 | Ni100 | Cu95Ni5 | 1070 | 3 | | ○ | 8.3 | 93.7 |
| Example 18 | 83/17 | Ni63Cr25Fe11Al1 | Ni100 | Cu95Ni5 | 1070 | 15 | | ○ | 7.5 | 91.1 |
| Example 19 | 83/17 | Ni65Cu33Fe2 | Ni100 | Cu95Ni5 | 1300 | 3 | | ○ | 54.1 | 45.9 |
| Comparative example 13 | 83/17 | Ni65Cu33Fe2 | Ni100 | Cu95Ni5 | 1070 | 3 | | ○ | 6.3 | 93.7 |
| Example 20 | 83/17 | Ni65Cu33Fe2 | Ni100 | Cu95Ni5 | 1070 | 15 | | ○ | 9.7 | 90.3 |
| Example 21 | 83/17 | Ni10Cr20Fe70 | Ni100 | Cu95Ni5 | 1300 | 3 | | ○ | 50.9 | 49.1 |
| Comparative example 14 | 83/17 | Ni10Cr20Fe70 | Ni100 | Cu95Ni5 | 1070 | 3 | | ○ | 6.3 | 93.7 |
| Example 22 | 83/17 | Ni10Cr20Fe70 | Ni100 | Cu95Ni5 | 1070 | 15 | | ○ | 7.6 | 92.4 |
| Example 23 | 83/17 | Fe88Cr11Si1 | Ni100 | Cu95Ni5 | 1300 | 3 | | ○ | 34.7 | 65.3 |
| Comparative example 15 | 83/17 | Fe88Cr11Si1 | Ni100 | Cu95Ni5 | 1070 | 3 | | ○ | 1.9 | 98.1 |
| Example 24 | 83/17 | Fe88Cr11Si1 | Ni100 | Cu95Ni5 | 1070 | 15 | | ○ | 8.8 | 93.2 |
| Example 25 | 83/17 | Ni100 | Cu10Ni90 | Cu95Ni5 | 1300 | 3 | | ○ | 59.9 | 40.1 |
| Comparative example 16 | 83/17 | Ni100 | Cu10Ni90 | Cu95Ni5 | 1070 | 3 | | ○ | 5.9 | 94.1 |
| Example 26 | 83/17 | Ni100 | Cu10Ni90 | Cu95Ni5 | 1070 | 15 | | ○ | 9.0 | 91.0 |
| Example 27 | 83/17 | Ni100 | Cu20Ni80 | Cu95Ni5 | 1300 | 3 | | ○ | 57.5 | 42.8 |
| Comparative example 17 | 83/17 | Ni100 | Cu20Ni80 | Cu95Ni5 | 1070 | 3 | | ○ | 8.0 | 92.0 |
| Example 28 | 83/17 | Ni100 | Cu20Ni80 | Cu95Ni5 | 1070 | 15 | | ○ | 8.8 | 93.4 |
| Example 29 | 83/17 | Ni100 | Cu30Ni70 | Cu95Ni5 | 1300 | 3 | | ○ | 56.8 | 43.2 |
| Comparative example 18 | 83/17 | Ni100 | Cu30Ni70 | Cu95Ni5 | 1070 | 3 | | ○ | 7.2 | 92.8 |
| Example 30 | 83/17 | Ni100 | Cu30Ni70 | Cu95Ni5 | 1070 | 15 | | ○ | 6.2 | 93.8 |
| Example 31 | 83/17 | Ni100 | Cu40Ni60 | Cu95Ni5 | 1300 | 3 | | ○ | 56.1 | 43.9 |
| Comparative example 19 | 83/17 | Ni100 | Cu40Ni60 | Cu95Ni5 | 1070 | 3 | | ○ | 5.7 | 94.3 |
| Example 32 | 83/17 | Ni100 | Cu40Ni60 | Cu95Ni5 | 1070 | 15 | | ○ | 5.9 | 94.1 |
| Example 33 | 83/17 | Ni100 | Cu50Ni50 | Cu95Ni5 | 1300 | 3 | | ○ | 13.2 | 86.8 |
| Comparative example 20 | 83/17 | Ni100 | Cu50Ni50 | Cu95Ni5 | 1070 | 3 | | ○ | 8.3 | 92.6 |
| Example 34 | 83/17 | Ni100 | Cu50Ni50 | Cu95Ni5 | 1070 | 15 | | ○ | 7.6 | 94.8 |
| Example 35 | 83/17 | Ni100 | Ni98Ag2 | Cu95Ni5 | 1300 | 3 | | ○ | 80.5 | 39.5 |
| Comparative example 21 | 83/17 | Ni100 | Ni98Ag2 | Cu95Ni5 | 1070 | 3 | | ○ | 5.2 | 94.8 |
| Example 36 | 83/17 | Ni100 | Ni98Ag2 | Cu95Ni5 | 1070 | 15 | | ○ | 8.9 | 91.1 |
| Example 37 | 83/17 | Ni100 | Ni89Cu9Ag2 | Cu95Ni5 | 1300 | 3 | | ○ | 56.4 | 43.6 |
| Comparative example 22 | 83/17 | Ni100 | Ni89Cu9Ag2 | Cu95Ni5 | 1070 | 3 | | ○ | 5.2 | 94.8 |

TABLE 1-continued

| Sample No. | Composition of metal member before bonding So/Sm | Composition of metal member before bonding (mass %) | Composition of cermet metal phase before bonding (mass %) | Composition of intermediate member before bonding (mass %) | Bonding temperature (° C.) | Bonding time (h) | Crack | Void | Intermediate layer Ni | Intermediate layer Cu |
|---|---|---|---|---|---|---|---|---|---|---|
| Example 38 | 83/17 | Ni100 | Ni89Cu9Ag2 | Cu95Ni5 | 1070 | 15 | | ○ | 9.8 | 90.4 |
| Example 39 | 83/17 | Ni100 | Ni69Cu29Ag2 | Cu95Ni5 | 1300 | 3 | | ○ | 17.6 | 92.4 |
| Comparative example 23 | 83/17 | Ni100 | Ni69Cu29Ag2 | Cu95Ni5 | 1070 | 3 | | ○ | 5.3 | 94.7 |
| Example 40 | 83/17 | Ni100 | Ni69Cu29Ag2 | Cu95Ni5 | 1070 | 15 | | ○ | 9.9 | 90.1 |
| Example 41 | 83/17 | Ni100 | Ni49Cu49Ag2 | Cu95Ni5 | 1300 | 3 | | ○ | 42.6 | 57.4 |
| Comparative example 24 | 83/17 | Ni100 | Ni49Cu49Ag2 | Cu95Ni5 | 1070 | 3 | | ○ | 5.1 | 94.9 |
| Example 42 | 83/17 | Ni100 | Ni49Cu49Ag2 | Cu95Ni5 | 1070 | 15 | | ○ | 7.7 | 92.3 |
| Example 43 | 90/10 | Ni100 | Ni100 | Cu95Ni5 | 1200 | 3 | | ○ | 35.2 | 54.8 |
| Example 44 | 71/29 | Ni100 | Ni100 | Cu95Ni5 | 1200 | 3 | | ○ | 39.5 | 80.5 |
| Example 45 | 60/40 | Ni100 | Ni100 | Cu95Ni5 | 1200 | 3 | | ○ | 41.1 | 58.9 |

TABLE 2

| Sample No. | Cu/entire cermet metal phase (mass %) | | | | Cu/entire cermet oxide phase (mass %) | | M10 − M100 (mass %) | Bonding strength (MPa) |
|---|---|---|---|---|---|---|---|---|
| | C10 | C50 | C100 | C1000 | M10 | M100 | | |
| Example 1 | 28.5 | 27.0 | 19.3 | 10.2 | 0.5 | 0.3 | 0.2 | 91.4 |
| Example 2 | 29.4 | 28.5 | 21.3 | 5.6 | 0.7 | 0.4 | 0.3 | 120.7 |
| Example 3 | 33.6 | 32.4 | 24.9 | 1.2 | 0.9 | 1.2 | −0.3 | 125.9 |
| Example 4 | 28.4 | 35.2 | 33.0 | 0 | 1.2 | 0.5 | 0.8 | 124.0 |
| Example 5 | 48.7 | 41.8 | 37.7 | 0 | 0.7 | 1.4 | −0.7 | 120.4 |
| Example 6 | 62.2 | 49.6 | 42.3 | 0 | 0.6 | 0.7 | −0.1 | 114.1 |
| Example 7 | 60.3 | 40.8 | 39.3 | 0 | 0.3 | 0.1 | 0.2 | 114.1 |
| Example 8 | 88.3 | 55.0 | 40.4 | 0 | 0.4 | 0.2 | 0.2 | 104.5 |
| Example 9 | 97.3 | 89.2 | 41.5 | 0 | 1.3 | 2.0 | −0.7 | 84.3 |
| Comparative example 1 | 97.5 | 66.7 | 0 | 0 | 2.1 | 1.4 | 0.7 | 41.8 |
| Example 10 | 88.4 | 72.0 | 61.6 | 0 | 1.5 | 0.9 | 0.6 | 75.8 |
| Comparative example 2 | 97.7 | 0 | 0 | 0 | 0.4 | 0.1 | 0.3 | 37.5 |
| Comparative example 3 | 88.4 | 57.9 | 0 | 0 | 0.6 | 0.6 | −0.2 | 42.5 |
| Example 11 | 79.4 | 58.4 | 47.0 | 0 | 1.2 | 0.9 | 0.3 | 52.1 |
| Comparative example 4 | 98.1 | 12.4 | 0 | 0 | 0.5 | 1.6 | −1.1 | 29.5 |
| Comparative example 5 | 98.3 | 9.4 | 0 | 0 | 0.3 | 0.7 | −0.4 | 27.6 |
| Comparative example 6 | 98.7 | 34.8 | 0 | 0 | 0.8 | 0.9 | −0.1 | 18.7 |
| Comparative example 7 | 98.9 | 13.2 | 0 | 0 | 0.1 | 0.5 | −0.4 | 10.2 |
| Comparative example 8 | 46.7 | 41.6 | 38.3 | 0 | 0.5 | 5.8 | −5.3 | 19.4 |
| Example 12 | 40.2 | 36.2 | 34.3 | 0 | 1.2 | 5.9 | −4.7 | 129.5 |
| Example 13 | 37.4 | 34.4 | 37.1 | 0 | 8.3 | 5.2 | 1.1 | 135.6 |
| Example 14 | 33.8 | 31.0 | 28.3 | 0 | 8.7 | 4.1 | 4.0 | 145.7 |
| Comparative example 9 | 30.5 | 28.8 | 25.1 | 0 | 11.2 | 5.0 | 5.8 | 13.2 |
| Comparative example 10 | 27.5 | 28.4 | 22.1 | 0 | 17.9 | 10.5 | 7.4 | 11.5 |
| Example 15 | 37.4 | 33.9 | 31.6 | 0 | 1.4 | 1.3 | 0.1 | 123.4 |
| Comparative example 11 | 95.5 | 51.9 | 0 | 0 | 3.1 | 1.5 | 1.8 | 45.3 |
| Example 18 | 88.7 | 57.9 | 42.1 | 0 | 4.4 | 0.6 | 3.8 | 76.2 |
| Example 19 | 41.2 | 35.3 | 33.1 | 0 | 4.1 | 0.6 | 3.8 | 118.7 |
| Comparative example 12 | 97.8 | 63.6 | 0 | 0 | 2.9 | 1.4 | 1.5 | 42.1 |
| Example 18 | 89.1 | 60.5 | 45.9 | 0 | 1.4 | 1.7 | −0.3 | 30.2 |
| Example 19 | 45.8 | 38.9 | 34.0 | 0 | 1.5 | 2.1 | −0.6 | 108.5 |
| Comparative example 13 | 98.1 | 62.5 | 0 | 0 | 0.9 | 1.4 | −0.5 | 39.6 |
| Example 20 | 90.5 | 53.4 | 36.7 | 0 | 0.8 | 0.7 | 0.1 | 75.4 |
| Example 21 | 40.3 | 37.6 | 35.9 | 0 | 1.6 | 0.2 | 1.4 | 140.0 |
| Comparative | 93.2 | 50.1 | 0 | 0 | 3.5 | 1.4 | 2.1 | 36.1 |

TABLE 2-continued

| Sample No. | Cu/entire cermet metal phase (mass %) | | | | Cu/entire cermet oxide phase (mass %) | | M10 − M100 (mass %) | Bonding strength (MPa) |
|---|---|---|---|---|---|---|---|---|
| | C10 | C50 | C100 | C1000 | M10 | M100 | | |
| example 14 | | | | | | | | |
| Example 22 | 87.4 | 49.0 | 32.4 | 0 | 1.3 | 1.0 | 0.3 | 78.2 |
| Example 23 | 48.8 | 40.1 | 34.9 | 0 | 1.1 | 1.0 | −0.0 | 17.3 |
| Comparative example 15 | 94.5 | 84.4 | 0 | 0 | 4.1 | 2.2 | 1.9 | 31.5 |
| Example 24 | 90.3 | 58.8 | 43.2 | 0 | 3.1 | 1.9 | 1.2 | 50.3 |
| Example 25 | 37.4 | 33.4 | 30.8 | 10.4 | 4.2 | 1.3 | 2.9 | 127.4 |
| Comparative example 16 | 97.3 | 72.7 | 0 | 0 | 3.1 | 1.4 | 1.7 | 42.1 |
| Example 26 | 90.3 | 59.2 | 57.1 | 10.5 | 3.3 | 1.7 | 1.0 | 75.5 |
| Example 27 | 39.4 | 37.0 | 38.4 | 19.8 | 4.2 | 2.8 | 1.6 | 121.7 |
| Comparative example 17 | 97.5 | 80.4 | 0 | 0 | 2.2 | 3.2 | −1.0 | 41.7 |
| Example 28 | 92.1 | 78.0 | 68.3 | 20.4 | 5.1 | 1.3 | 3.8 | 79.2 |
| Example 29 | 39.8 | 38.9 | 38.4 | 29.4 | 3.2 | 2.1 | 1.1 | 121.6 |
| Comparative example 18 | 98.1 | 83.9 | 0 | 0 | 2.2 | 1.1 | 1.1 | 42.1 |
| Example 30 | 92.1 | 80.9 | 73.2 | 29.7 | 1.3 | 2.5 | −1.2 | 78.8 |
| Example 31 | 43.6 | 46.0 | 48.0 | 40.2 | 3.1 | 2.7 | 0.4 | 120.3 |
| Comparative example 19 | 98.1 | 83.9 | 0 | 0 | 2.5 | 2.5 | −0.1 | 39.5 |
| Example 32 | 94.1 | 83.9 | 77.3 | 39.5 | 2.2 | 1.1 | 1.1 | 78.7 |
| Example 33 | 14.3 | 12.1 | 76.0 | 50.7 | 5.1 | 7.3 | 3.8 | 110.3 |
| Comparative example 20 | 98.1 | 84.0 | 0 | 0 | 3.2 | 2.1 | 1.1 | 39.1 |
| Example 34 | 94.9 | 17.4 | 82.5 | 49.0 | 3.5 | 2.2 | 1.3 | 75.2 |
| Example 35 | 37.3 | 34.0 | 31.9 | 0 | 2.0 | 0.4 | 1.6 | 122.4 |
| Comparative example 21 | 91.2 | 78.8 | 0 | 0 | 2.9 | 0.1 | 2.8 | 40.2 |
| Example 36 | 86.7 | 59.2 | 45.1 | 0 | 2.4 | 0.7 | 1.7 | 77.3 |
| Example 37 | 47.5 | 38.3 | 35.6 | 10.4 | 1.1 | 1.3 | −0.2 | 119.6 |
| Comparative example 22 | 89.4 | 77.5 | 0 | 0 | 0.8 | 1.5 | −1.0 | 98.7 |
| Example 38 | 89.1 | 65.5 | 54.3 | 10.4 | 4.1 | 1.1 | 3.0 | 76.3 |
| Example 39 | 51.9 | 49.3 | 47.6 | 30.4 | 3.3 | 1.7 | 1.6 | 118.7 |
| Comparative example 23 | 87.2 | 75.6 | 0 | 0 | 2.8 | 2.3 | 0.3 | 35.1 |
| Example 40 | 81.2 | 72.0 | 66.1 | 28.1 | 3.7 | 2.4 | 1.3 | 75.4 |
| Example 41 | 55.2 | 55.1 | 55.1 | 49.3 | 3.2 | 1.3 | 1.9 | 112.4 |
| Comparative example 24 | 83.1 | 72.7 | 0 | 0 | 2.1 | 1.0 | 1.1 | 35.1 |
| Example 42 | 80.8 | 75.9 | 72.5 | 49.8 | 3.4 | 2.2 | 1.2 | 75.1 |
| Example 43 | 67.9 | 43.2 | 44.1 | 0 | 2.1 | 1.9 | 0.2 | 108.3 |
| Example 44 | 69.4 | 60.3 | 45.3 | 0.5 | 0.6 | 1.1 | −0.3 | 117.6 |
| Example 45 | 55.1 | 53.5 | 43.7 | 3.2 | 1.2 | 0.0 | 0.9 | 121.4 |

The results will be explained using Table 1 and Table 2. The example with no crack, and having 50 MPa or more of the bonding strength obtained by the four point bending test was evaluated as a good example.

Here, the example with no crack and having 50 MPa or more of the bonding strength will be discussed. As shown in Table 2, for these examples, the mass ratio of Cu of the cermet metal phase and the cermet oxide phase in the cermet member satisfied the relation of the aforementioned equation 1 and the equation 2, and Cu is selectively diffusing to the cermet metal phase in the cermet member. This is because, by selecting the appropriate heat treatment temperature and the heat treatment time, Cu in the intermediate layer has sufficiently diffused selectively to the cermet metal phase of the cermet member. For these examples, a good composite body having the bonding strength higher than 50 MPa was obtained.

On the contrary to the above mentioned examples, in the comparative examples 1 to 7, and 11 to 24, Cu did not efficiently diffuse into the cermet metal phase, a gradient composition satisfying the equation 1 was unable to obtain. For these comparative examples, Cu concentrated at the area near the boundary between the intermediate layer and the cermet member, and the bonding strength was lower than 50 MPa hence good composite body was unable to obtain. Particularly, in comparative examples 6 and 7 which had 5% or more of voids in the intermediate layer exhibited even lower bonding strength. This is because many voids were generated and the stress was focused at the area near the boundary between the intermediate layer and the cermet member.

Also, the comparative examples 8 to 10 did satisfy the condition of equation 1, but did not satisfy the condition of equation 2. That is, Cu diffusion occurred in the entire cermet member, and the crack was generated in the cermet member. Thus, the bonding strength resulted in 20 MPa or less.

In the examples, at the area near the boundary of the cermet member, as moving away from the boundary between the intermediate layer and the cermet member, the thermal expansion coefficient is thought to be changing stepwise while forming a gradient. Thereby, the residual stress is also distributed by changing gradually within the cermet member. As a result, in the cermet member, the area where the residual stress is locally concentrated is thought to be disappeared. Thereby, even if only little voids are formed in the intermediate layer, the crack is suppressed from generating.

Next, the bonding strength will be discussed. In the examples, the bonding strength was more than 50 MPa. This is thought to be caused by the selective diffusion of Cu to the cermet metal phase which caused fewer parts where the residual stress locally concentrates.

Here, the thermal expansion coefficient of each metal will be discussed. The thermal expansion coefficient of Cu included in the intermediate member is higher than the thermal expansion coefficient of Ni included in the cermet metal phase of before the bonding. Therefore, usually, if Cu is locally concentrated at the area near the boundary between the intermediate layer and the cermet member, the difference of the thermal expansion between the cermet member and the metal member at said position will increase. On the contrary to this, in the composite body of the present invention, Cu of the intermediate member selectively diffuses to the cermet metal phase present inside of the cermet member. Thus, at the area near the boundary between the intermediate layer and the cermet member, the difference of the thermal expansion between the cermet member and the intermediate layer at said position decreases, which is thought to result in the reduction of the residual stress in the cermet member.

Figure 5:
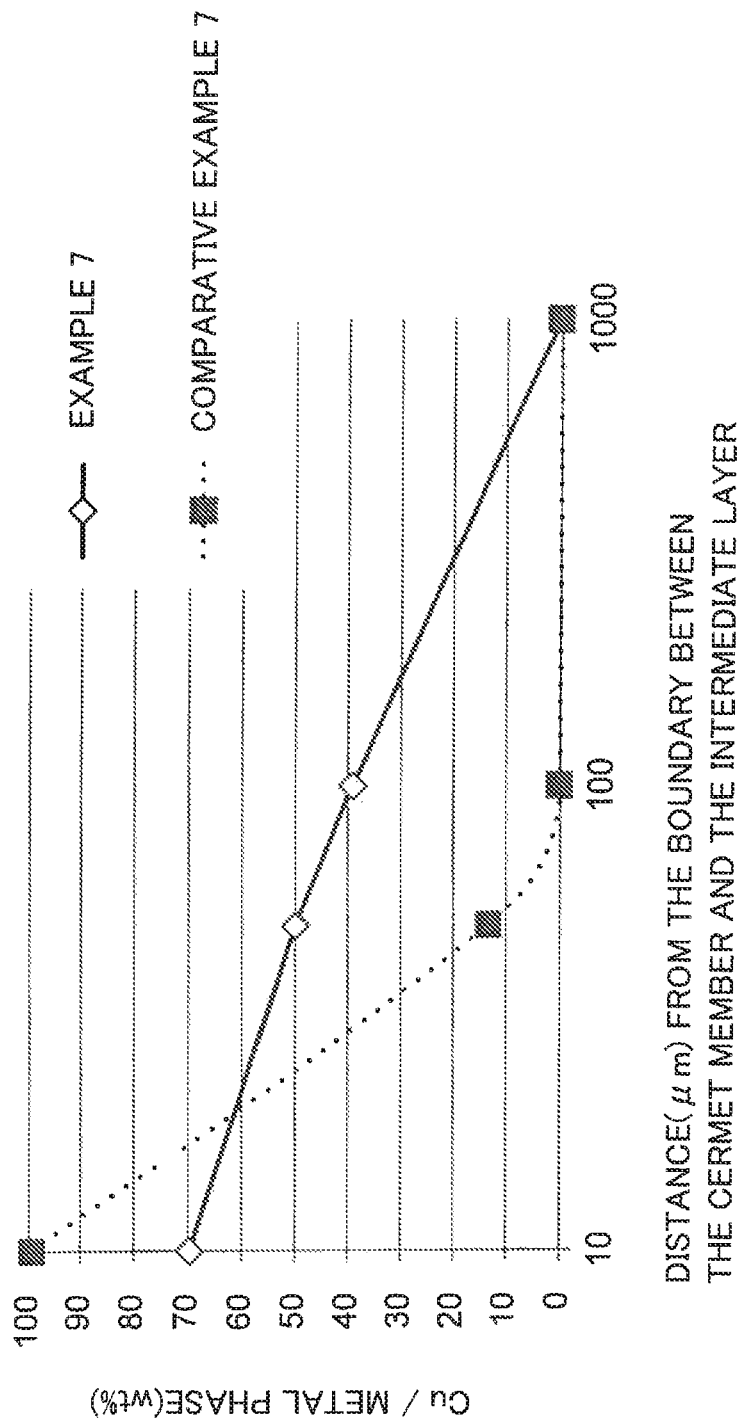
FIG. 5 is a diagram showing the relation between the cermet member and the mass ratio of Cu with respect to entire cermet metal phase and distance from the boundary between the intermediate layers.

Regarding the difference in the movement of the diffusion between the examples and the comparative examples will be explained using FIG. 5. The example 7 and the comparative example 7 of FIG. 5 indicates the relation between the distance from the boundary between the intermediate layer and the cermet member, and the mass ratio of Cu with respect to the cermet metal phase in the cermet member. As obvious from FIG. 5, in case of the example 7, the mass ratio of Cu is distributed all the way to the position of 1000 μm in the cermet member; on the contrary, in the comparative example 7, there is no difference in the mass ratio of Cu at the positions of 100 μm and 1000 μm which indicate that the diffusion of Cu did not proceeded sufficiently. In the comparative example 7, the residual stress due to the thermal expansion difference exist in the cermet member is thought to have generated the crack and caused the decrease of the bonding strength.

Next, the examples 1 to 9 and the comparative examples 1, 2, 4 to 7 will be discussed wherein the metal member, the cermet member and the intermediate member were respectively the same in order to examine the thermal treatment temperature. As a result of these, if the heat treatment temperature was 1085° C. or higher, in case the heat treatment time was 3 hours, the composite body wherein Cu has sufficiently diffused to the metal phase and satisfying the equation 1 can be obtained. Also, the examples 1 to 9 satisfied the condition of the equation 2, and a good composite body was able to be obtained.

Next, when comparing the comparative example 1 against the example 10, and comparing the comparative examples 2 and 3 against the example 11 wherein the heat treating time has been changed respectively, even in case of the comparative examples 1 and 2 wherein the mass ratio of Cu in the entire cermet metal phase did not satisfy equation 1, if the equation 1 was satisfied as the diffusion of Cu to the cermet metal phase was promoted by increasing the heat treatment time, then the bonding strength was increased. Specifically, the example 10 having the heat treatment time of 15 hours in contrast to the comparative example 1, and the example 11 having the heat treatment time of 75 hours in contrast to the comparative examples 2 and 3 resulted in a good composite body which satisfied the relation of the equation 1 and also having the bonding strength of 50 MPa or more. Also, for these examples, the equation 2 which is the condition for the cermet oxide phase was also satisfied.

However, when comparing the comparative examples 8 to 10 against the examples 4, 12 to 14 wherein the heat treatment time was changed but the heat treatment temperature was 1300° C., if the heat treatment time was not appropriate, the bonding strength decreased. This is, because the mass ratio of Cu in the cermet oxide phase with respect to the cermet oxide phase had changed due to the diffusion, and as a result the relation of the equation 2 was not satisfied.

As discussed in the above, the heat treatment temperature and the heat treatment time are complementary to each other, and by selecting the appropriate condition, the bonding can be done. Thus, the present invention does not have particular limitation for the heat treatment temperature and the heat treatment time.

For the examples 4, 10, 15 to 24 and the comparative examples 1, 11 to 15, the metal members being used were examined. Here, in Table 1 and Table 2, the same metal members were used and the heat treatment condition was examined by making a comparison between, the examples 4 and 10 against the comparative example 1; the examples 15 and 16 against the comparative 11; the examples 17 and 18 against the comparative example 12; the examples 19 and 20 against the comparative example 13; the examples 21 and 22 against the comparative example 14; and the examples 23 and 24 against the comparative example 15. According to these comparisons, if the appropriate heat treatment temperature and the heat treatment time were selected, regardless of the type of the metal member, the relation between the aforementioned equation 1 and the equation 2 can be satisfied. Thereby, a good composite body having the boding strength larger than 50 MPa was obtained. Thus, the present invention does not particularly limit the metal member.

Also, the examples 1 to 22 and 25 to 42 using Ni or alloy having Ni as the main component as the metal member had increased bonding strength compared to the examples 23 and 24 which used the alloy without Ni. This is because Ni had diffused to the intermediate layer from the metal member thereby enhanced the strength. Thus, these examples were defined as the preferable example of the present invention.

Further, depending on the composite body, if the molten salt electrolysis is to be carried out, then from the point of the solubility to the molten salts, Ni or alloy including Ni was preferably selected as the metal member.

Examples 4, 10 and 25 to 34, and the comparative examples 1 and 16 to 20 showed the cases of changing the ratio of Ni and Cu of the cermet metal phase in the cermet member before the bonding. Here, in Table 1, the same metal member was used before the bonding and the heat treatment condition was examined by making a comparison between, the examples 4 and 10 against the comparative example 1; the examples 25 and 26 against the comparative example 16; the examples 27 and 28 against the comparative example 17; the examples 29 and 30 against the comparative example 18; the examples 31 and 32 against the comparative example 19; and the examples 33 and 34 against the comparative example 20. The results indicated that by selecting an appropriate heat treatment temperature and heat treatment time, a good composite body having the bonding strength of 50 MPa or more can be obtained regardless of the ratio of Ni and Cu in the cermet metal phase before the bonding. Thus, for the present invention, the ratio between Ni and Cu in the cermet metal phase of the cermet member before the bonding is not particularly limited.

The examples 35 to 42 and the comparative examples 21 to 24 indicate the case wherein a metal other than Cu and Ni is included in said metal phase before the bonding. Here, in Table, the same metal members were used and the heat treatment condition was examined. By respectively comparing, the examples 35 and 36 against the comparative example 21; the examples 37 and 38 against the comparative example 22; the examples 39 and 40 against the comparative example 23; and the examples 41 and 42 against the comparative example 24; the results indicated that even in case Ag was included in the cermet metal phase of before the bonding, if an appropriate heat treatment temperature and heat treatment time were selected, then the relations shown in aforementioned equation 1 and equation 2 were satisfied, and a good composite body having a bonding strength of 50 MPa or more can be obtained. These cases are also within the scope of the present invention.

In regards with the examples, regardless of the composition of the intermediate layer, the bonding strength exceeded 50 MPa or more. Therefore, these examples are within the scope of the present invention. In regards with this point, the examples 2 to 8, 12 to 14, 15, 17, 19, 21, 23, 25, 27, 29, 31, 33, 35, 37, 39, and 41 wherein the mass ratio of Ni and Cu were 10≤Ni≤70 (mass %) and 30≤Cu≤90 (mass %) were considered as more preferable examples of the present invention.

Hereinabove, the composite body comprising the cermet and the metal member wherein Cu is selectively diffusing to the cermet metal phase has been discussed. Such composite body has a gradually changing stress applied to the cermet member which is caused by the bonding, and the composite body exhibits suitable bonding strength.

Further, the examples 43 to 45 were produced as similar to the example 6 except that the used ratio of the ferrite oxide and the metal powder was changed so that the area ratio (So/Sm) between the cermet oxide phase and the cermet metal phase in the cermet member was 60/40 to 90/10.

Even if So/Sm were changed, the relation of the aforementioned equation 1 and equation 2 were satisfied. Thus, the examples 43 to 45 resulted in a good composite body having a bonding strength of 50 MPa or more. Therefore, the examples 43 to 45 were considered to be within the scope of the present invention.

Experiment 2

Examples 50 to 75

On the contrary to the experiment 1, in the experiment 2, the mixing ratio of NiO powder and $Fe_2O_3$ powder was changed so that the mol ratio of NiO and $Fe_2O_3$ was 50:50. Also, the time for bonding was changed. Further, the intermediate member having the material shown in Table 2 was prepared (for the example 50, only the first intermediate member; for the examples 51 to 69, the first intermediate member and the second intermediate member; the examples 70 to 75, the first intermediate member, the second intermediate member and the third intermediate member). The thickness of each intermediate member was 0.02 cm.

Further, in case the third intermediate member was not used (the examples 51 to 69), the first intermediate member was placed on the cermet member, the second intermediate member was placed on the first intermediate member, and the metal member was placed on the second intermediate member. Here, the first intermediate member and the second intermediate member were placed so that the first intermediate member was in contact with the face of the cermet member carried out with the mirror treatment, and the second intermediate member was in contact with the face of the metal member carried out with the mirror treatment.

In case the second intermediate member and the third intermediate member were not used (the example 50), the first intermediate member was placed on the cermet member, and the metal member was placed on the first intermediate member. Here, the first intermediate member was placed so that the first intermediate member was in contact with the face of the cermet member carried out with the mirror treatment and also in contact with the face of the metal member carried out with the mirror treatment.

In case of using the third intermediate member (the examples 70 to 75), the third intermediate member was placed on the second intermediate member, and the metal member was placed on the third intermediate member, other than that it was the same as the case of not using the third intermediate member. Here, the first intermediate member was in contact with the face of the cermet member carried out with the mirror treatment, and the third intermediate member was in contact with the face of the metal member carried out with the mirror treatment.

The examples 51 to 75 of Table 3 were produced as similar to the example 6 of the experiment 1 except for the condition mentioned in the above and the condition shown in Table 3. Note that, for the sake of comparison, the example 50 was also produced wherein the bonding time and the mixing ratio of NiO powder and $Fe_2O_3$ powder were changed from the condition of the example 6. For these samples, various characteristics shown in Table 4 were measured. Note that, in all examples, cracks did not occur, and the void ratio in the intermediate layer was less than 5%.

TABLE 3

| Sample No. | So/Sm | First intermediate member | Second intermediate member | Third intermediate member | Bonding temperature (° C.) | Bonding time (h) | First intermediate layer Ni (mass %) | First intermediate layer Cu (mass %) | Second intermediate layer Ni (mass %) | Second intermediate layer Cu (mass %) | Third intermediate layer Ni (mass %) | Third intermediate layer Cu (mass %) |
|---|---|---|---|---|---|---|---|---|---|---|---|---|
| Example 50 | 83/17 | Cu100 | None | None | 1200 | 10 | 42 | 58 | None | None | None | None |
| Example 51 | 83/17 | Cu100 | Ni100 | None | 1200 | 10 | 36 | 64 | 100 | 0 | None | None |
| Example 55 | 83/17 | Cu100 | Ni100 | None | 1085 | 10 | 5 | 95 | 100 | 0 | None | None |
| Example 56 | 83/17 | Cu100 | Ni100 | None | 1125 | 10 | 15 | 85 | 100 | 0 | None | None |
| Example 57 | 83/17 | Cu100 | Ni100 | None | 1150 | 10 | 30 | 70 | 100 | 0 | None | None |
| Example 58 | 83/17 | Cu100 | Ni100 | None | 1250 | 10 | 57 | 43 | 100 | 0 | None | None |
| Example 59 | 83/17 | Cu100 | Ni100 | None | 1300 | 10 | 63 | 37 | 100 | 0 | None | None |

TABLE 3-continued

| | | | | | | | First intermediate layer | | Second intermediate layer | | Third intermediate layer | |
|---|---|---|---|---|---|---|---|---|---|---|---|---|
| Sample No. | So/Sm | First intermediate member | Second intermediate member | Third intermediate member | Bonding temperature (° C.) | Bonding time (h) | Ni (mass %) | Cu (mass %) | Ni (mass %) | Cu (mass %) | Ni (mass %) | Cu (mass %) |
| Example 60 | 83/17 | Cu100 | Ni100 | None | 1375 | 10 | 75 | 25 | 100 | 0 | None | None |
| Example 61 | 83/17 | Cu100 | Ni100 | None | 1200 | 10 | 41 | 59 | 100 | 0 | None | None |
| Example 62 | 83/17 | Cu80Ni20 | Ni100 | None | 1200 | 10 | 62 | 38 | 100 | 0 | None | None |
| Example 63 | 83/17 | Cu60Ni40 | Ni100 | None | 1200 | 10 | 45 | 55 | 100 | 0 | None | None |
| Example 65 | 83/17 | Cu100 | Cu5Ni95 | None | 1200 | 10 | 44 | 56 | 95 | 5 | None | None |
| Example 66 | 83/17 | Cu100 | CU15Ni85 | None | 1200 | 10 | 46 | 54 | 85 | 15 | None | None |
| Example 67 | 83/17 | Cu100 | Cu25Ni75 | None | 1200 | 10 | 47 | 53 | 75 | 25 | None | None |
| Example 68 | 83/17 | Cu100 | Cu40Ni60 | None | 1200 | 10 | 47 | 53 | 60 | 40 | None | None |
| Example 69 | 83/17 | Cu100 | Cu50Ni50 | None | 1200 | 10 | 49 | 51 | 50 | 50 | None | None |
| Example 70 | 83/17 | Cu100 | Ni100 | Cu100 | 1085 | 10 | 15 | 85 | 100 | 0 | 14 | 86 |
| Example 71 | 83/17 | Cu100 | Ni100 | Cu100 | 1125 | 10 | 30 | 70 | 100 | 0 | 27 | 73 |
| Example 72 | 83/17 | Cu100 | Ni100 | Cu100 | 1150 | 10 | 43 | 57 | 100 | 0 | 42 | 58 |
| Example 73 | 83/17 | Cu100 | Ni100 | Cu100 | 1250 | 10 | 57 | 43 | 100 | 0 | 53 | 47 |
| Example 74 | 83/17 | Cu100 | Ni100 | Cu100 | 1300 | 10 | 65 | 35 | 100 | 0 | 62 | 38 |
| Example 75 | 83/17 | Cu100 | Ni100 | Cu100 | 1375 | 10 | 75 | 25 | 100 | 0 | 76 | 24 |

TABLE 4

| Sample No. | C10 | C50 | C100 | C1000 | M10 | M100 | M10 - M100 | Bonding strength (MPa) |
|---|---|---|---|---|---|---|---|---|
| Example 50 | 54.3 | 48.2 | 26.7 | 4.1 | 1.2 | 0.9 | 0.3 | 129.5 |
| Example 51 | 51.3 | 42.7 | 36.9 | 20.4 | 0.2 | 0.1 | 0.1 | 142.1 |
| Example 55 | 28.3 | 25.1 | 23.1 | 11.5 | 4.2 | 2.1 | 2.1 | 132.6 |
| Example 56 | 30.1 | 26.5 | 24.2 | 20.1 | 1.1 | 3.2 | −2.1 | 137.4 |
| Example 57 | 50.1 | 41.1 | 35.6 | 19.4 | 2.9 | 1.9 | 1 | 139.1 |
| Example 58 | 52.2 | 42.5 | 36.8 | 21.3 | 0.3 | 0.7 | −0.4 | 140.2 |
| Example 59 | 40.1 | 33.9 | 30.1 | 19.1 | 1.7 | 1.1 | 0.6 | 143.3 |
| Example 60 | 42.1 | 35.4 | 31.2 | 13.5 | 3.7 | 0.8 | 2.9 | 149.1 |
| Example 61 | 47.7 | 39.4 | 34.3 | 16.5 | 1.9 | 1.1 | 0.8 | 147.1 |
| Example 62 | 45.1 | 34.5 | 26.9 | 18.9 | 3.5 | 2.7 | 0.8 | 142.1 |
| Example 63 | 33.5 | 29.1 | 26.2 | 21.4 | 4.4 | 2.9 | 1.5 | 140.6 |
| Example 65 | 53.9 | 43.7 | 37.7 | 24.2 | 2.7 | 1.7 | 1 | 153.3 |
| Example 66 | 56.1 | 45.3 | 38.8 | 18.7 | 4.1 | 0.5 | 3.6 | 152.7 |
| Example 67 | 60.1 | 48.0 | 40.9 | 16.2 | 3.3 | 1.2 | 2.1 | 151.1 |
| Example 68 | 60.9 | 48.6 | 41.3 | 9.8 | 6.3 | 1.4 | 4.9 | 150.1 |
| Example 69 | 66.3 | 52.3 | 44.1 | 20.6 | 2.2 | 0.2 | 2 | 148.7 |
| Example 70 | 75.3 | 58.3 | 48.6 | 22.5 | 5.6 | 3.5 | 2.1 | 139.2 |
| Example 71 | 62.4 | 49.5 | 42.1 | 29.5 | 5.1 | 1.9 | 3.2 | 143.1 |
| Example 72 | 57.2 | 46.0 | 39.4 | 27.6 | 1.1 | 2.1 | −1.0 | 147.6 |
| Example 73 | 52.3 | 42.6 | 36.8 | 24.2 | 0.9 | 0.7 | 0.2 | 150.1 |
| Example 74 | 49.5 | 40.6 | 35.3 | 32.1 | 0.1 | 4.9 | −4.8 | 152.1 |
| Example 75 | 62.1 | 49.4 | 41.9 | 27.5 | 3.1 | 1.4 | 1.7 | 154.2 |

According to the examples 51 to 75, by using plurality of intermediate members, even in case of comprising plurality of intermediate layers, if the equation 1 and the equation 2 were satisfied, a suitable bonding strength was exhibited.

Here, the examples 51 to 75 comprising a plurality of intermediate layers had increased bonding strength compared to the composite body comprising only the first intermediate layer. Therefore, the examples 51 to 75 were determined as more preferable examples of the present invention.

Experiment 3

Examples 80 to 92

As similar to the experiment 2, in the experiment 3, the mixing ratio of NiO powder and $Fe_2O_3$ powder was set so that the mol ratio of NiO and $Fe_2O_3$ was 50:50. Further, the mixed molded body produced by the following method was used as the intermediate member. The examples 81 to 92 shown in Table 5 were obtained as similar to the example 50 of the experiment 2 except for the condition discussed in the above and the condition shown in Table 5. Further, various characteristics shown in Table 5 and Table 6 were measured. No cracks were found in all of the examples, and the void ratio in the intermediate layer was less than 5%.

The method of producing the mixed molded body of the experiment 3 is as described in below. As the metal powder which is the source material of the mixed molded article, Cu powder was selected. Also, as the powder of oxide which is the source material of the mixed molded body, NiO—$NiFe_2O_4$ powder was selected. These were mixed so that the mixing ratio satisfied Cu metal:NiO—$NiFe_2O_4$ powder=100:0 to 50:50 (mass %) (not including 100:0). By changing the mass ratio of Cu metal and NiO—$NiFe_2O_4$ powder, the area ratio between the intermediate metal phase and the intermediate oxide phase in the intermediate layer can be regulated to an arbitrary value. The obtained mixed powder was applied with a pressure of 195 MPa so that the thickness was 0.02 cm, thereby the mixed molded body was produced.

Further, for each example, the area ratio of the intermediate oxide phase was calculated. The steps of calculating includes a step of determining the area to be measured from BET image of each sample, and a step of calculating the area ratio occupied by the intermediate oxide phase in the position determined as the area to be measured. Each step will be described in below.

For each sample, the BEI image of the area of said intermediate layer placed between said cermet metal member and said metal member was observed under 100× magnifications. Next, the distance "d" was measured which is the distance from the boundary between said cermet member and said intermediate member, to the intermediate oxide phase present towards said intermediate layer side and also present at the furthest position from said boundary in perpendicular direction (the gray part of BEI image). Specifically, the distance "d" was obtained by measuring the distance between the boundary and the furthest position from said boundary, wherein said furthest position is the position which is the furthest among the intersection points formed between the perpendicular line from the boundary between said cermet member and said intermediate layer, and the area occupied by said intermediate oxide phase of said BEI image. The area in said intermediate member wherein the distance from the boundary was less than "d" distance was defined as the area to be measured.

In said area to be measured, a contrast of BEI image was analyzed, and the area ratio of the gray part showing said intermediate oxide phase was calculated with respect to the entire said BEI image. The same calculations were carried out to 10 fields of visions, and the average area ratio of said gray part was calculated. The obtained result was defined as the area ratio of said intermediate oxide phase in said intermediate layer.

TABLE 5

| | | Intermediate member | | | | Intermediate layer | |
|---|---|---|---|---|---|---|---|
| Sample No. | So/Sm | Mixing ratio of Cu (mass %) | Mixing ratio of oxide of (NiO—NiFe2O4) (mass %) | Bonding temperature (° C.) | Bonding time (h) | Area ratio of intermediate metal phase (%) | Area ratio of intermediate oxide phase (%) |
| Example 50 | 83/17 | 100 | 0 | 1200 | 10 | 100 | 0 |
| Example 81 | 83/17 | 98.5 | 1.5 | 1200 | 10 | 89.8 | 10.2 |
| Example 82 | 83/17 | 98 | 2 | 1200 | 10 | 87.7 | 12.3 |
| Example 83 | 83/17 | 96.5 | 3.5 | 1200 | 10 | 85.7 | 14.3 |
| Example 84 | 83/17 | 96 | 4 | 1200 | 10 | 77.4 | 22.8 |
| Example 85 | 83/17 | 95 | 5 | 1200 | 10 | 70.5 | 29.5 |
| Example 86 | 83/17 | 92 | 8 | 1200 | 10 | 87.9 | 32.1 |
| Example 87 | 83/17 | 90 | 10 | 1200 | 10 | 82.2 | 37.8 |
| Example 88 | 83/17 | 85 | 15 | 1200 | 10 | 57.9 | 42.1 |
| Example 89 | 83/17 | 80 | 20 | 1200 | 10 | 55.7 | 44.3 |
| Example 90 | 83/17 | 75 | 25 | 1200 | 10 | 54.9 | 45.1 |
| Example 91 | 83/17 | 70 | 30 | 1200 | 10 | 52.8 | 47.2 |
| Example 92 | 83/17 | 65 | 35 | 1200 | 10 | 50.2 | 49.8 |

TABLE 6

| Sample No. | C10 | C50 | C100 | C1000 | M10 | M100 | M10 − M100 | Bonding strength (MPa) |
|---|---|---|---|---|---|---|---|---|
| Example 50 | 54.3 | 48.2 | 26.7 | 4.1 | 1.2 | 0.9 | 0.3 | 129.5 |
| Example 81 | 53.1 | 47.6 | 25.3 | 3.2 | 0.2 | 5.0 | −4.8 | 146.2 |
| Example 82 | 52.4 | 44.8 | 23.3 | 2.5 | 1.5 | 3.2 | −1.7 | 148.1 |
| Example 83 | 51.0 | 42.1 | 21.3 | 1.3 | 2.1 | 3.4 | −1.3 | 148.8 |
| Example 84 | 47.2 | 39.6 | 19.5 | 0.9 | 5.2 | 0.3 | 4.9 | 150.4 |
| Example 85 | 44.5 | 37.8 | 18.2 | 0.5 | 3.1 | 1.1 | 2.0 | 153.1 |
| Example 86 | 33.2 | 30.1 | 12.5 | 0 | 2.1 | 4.5 | −2.4 | 157.1 |
| Example 87 | 23.3 | 23.3 | 10.3 | 0 | 0.1 | 1.2 | −1.1 | 157.6 |
| Example 88 | 22.1 | 15.4 | 9.6 | 0 | 4.3 | 0.2 | 4.1 | 159.1 |
| Example 89 | 19.5 | 13.1 | 8.2 | 0 | 4.5 | 1.2 | 3.3 | 159.4 |
| Example 90 | 18.2 | 12.1 | 8.1 | 0 | 1.0 | 0.1 | 0.9 | 159.4 |
| Example 91 | 15.3 | 11.7 | 7.2 | 0 | 4.6 | 4.3 | 0.3 | 160.1 |
| Example 92 | 17.1 | 10.9 | 6.5 | 0 | 3.1 | 1.2 | 1.9 | 160.3 |

According to Table 5 and Table 6, even in case the intermediate oxide phase was included in the intermediate layer, if the equation 1 and the equation 2 were satisfied, a suitable bonding strength was exhibited.

Also, the examples 81 to 92 of which the intermediate layer included the intermediate oxide phase exhibited higher bonding strength than the example 50 wherein the intermediate layer only comprised the intermediate metal phase. Thus, these were determined as more preferable examples of the present invention.

INDUSTRIAL APPLICABILITY

As discussed in above, the composite body comprising the cermet member and the metal member wherein Cu in the intermediate layer is selectively diffusing to the cermet metal phase such as in the present invention exhibits preferable bonding strength. By using the composite body of the present invention, a hybrid electrolysis electrode having the benefit of the cermet member and the metal member can be produced.

NUMERICAL REFERENCES

1 . . . Metal member
2 . . . Intermediate member
3 . . . Cermet member
4 . . . Intermediate layer
5 . . . Cermet oxide phase
5a . . . Spinel ferrite phase
5b . . . Nickel oxide phase
6 . . . Cermet metal phase
8 . . . Cermet metal phase (C10 measurement)
9 . . . Cermet metal phase (C50 measurement)
10 . . . Cermet metal phase (C100 measurement)
11 . . . Cermet metal phase (C1000 measurement)
12 . . . Cermet oxide phase (M10 measurement)
13 . . . Cermet oxide phase (M100 measurement)
41 . . . First intermediate layer
42 . . . Second intermediate layer
43 . . . Third intermediate layer
46 . . . Intermediate metal phase
48 . . . Intermediate oxide phase
D1, D2, D3 . . . Size of cermet member
D4, D5, D6 . . . Size of metal member

The invention claimed is:

1. A composite body comprising a cermet member, a metal member, and an intermediate layer, wherein:
the cermet member includes a cermet oxide phase and a cermet metal phase,
the cermet oxide phase includes an oxide including Ni or an oxide including Fe,
the cermet metal phase includes Ni,
the intermediate layer includes Cu, and
when mass ratios of Cu in the metal phase at positions away by 10, 50, 100, 1000 μm from a boundary between the cermet member and the intermediate layer towards the cermet member are defined as C10, C50, C100 and C1000 (mass %), and
when mass ratios of Cu in the oxide phase at positions away by 10 and 100 μm from the boundary towards the cermet member side are defined as M10 and M100 (mass %), then the following Equation 1 and Equation 2 are satisfied simultaneously:

$C10 > C50 > C100 > C1000$ (mass %): (Equation 1)

$5 > M10 - M100 > -5$ (mass %): (Equation 2).

2. The composite body as set forth in claim 1, wherein the metal member at least includes Ni.

3. The composite body as set forth in claim 1, wherein when the mass ratio of Ni and Cu in the intermediate layer are expressed in terms of percentage, Ni is $10 < Ni < 70$ (mass %) and Cu is $30 < Cu < 90$ (mass %).

4. The composite body as set forth in claim 1, wherein the intermediate layer at least comprises a first intermediate layer and a second intermediate layer,
the first intermediate layer is bonded to the cermet member,
the first intermediate layer at least includes Cu as a first metal,
the second intermediate layer at least includes M2 as a second metal,
a melting point of Cu as the first metal is lower than the melting point of M2 as the second metal,
a mass concentration of Cu in the first intermediate layer is higher than the mass concentration of Cu in the second intermediate layer, and
the mass concentration of M2 in the second intermediate layer is higher than the mass concentration of M2 in the first intermediate layer.

5. The composite body as set forth in claim 4, wherein the first intermediate layer is also bonded to the second intermediate layer.

6. The composite body as set forth in claim 4, wherein the second intermediate layer is also bonded to the metal member.

7. The composite body as set forth in claim 4, wherein a mass ratio between Cu and M2 (Cu/M2) in the first intermediate layer is within the range of below Equation 3:

$40/60 \leq Cu/M2 \leq 90/10$: (Equation 3).

8. The composite body as set forth in claim 4, wherein M2 is Ni.

9. The composite body as set forth in claim 4, wherein the intermediate layer comprises a third intermediate layer in addition to the first intermediate layer and the second intermediate layer, and
the third intermediate layer is bonded to the metal member.

10. The composite body as set forth in claim 9, wherein:
the mass concentration of Cu in the third intermediate layer is higher than the mass concentration of Cu in the second intermediate layer, and
the mass concentration of M2 in the third intermediate layer is lower than the mass concentration of M2 in the second intermediate layer.

11. The composite body as set forth in claim 9, wherein the second intermediate layer is bonded to the first intermediate layer and the third intermediate layer.

12. The composite body as set forth in claim 1, wherein the cermet oxide phase included in the cermet member at least includes an oxide of Ni.

13. The composite body as set forth in claim 1, wherein at least part of the cermet oxide phase included in the cermet member is made of nickel ferrite.

14. The composite body as set forth in claim 1, wherein the intermediate layer includes an intermediate oxide phase and an intermediate metal phase, and
the intermediate oxide phase includes at least one oxide of metal.

15. The composite body as set forth in claim 14, wherein the at least one oxide of metal is selected from the oxide of metal included in the cermet oxide phase.

16. The composite body as set forth in claim 14, wherein at a cross section face where the composite body is cut perpendicularly to the boundary between the cermet member and the intermediate member, in case a total of an area occupied by the intermediate oxide phase and an area occupied by the intermediate metal phase at an area where the intermediate oxide phase exists is 100%, then an area ratio occupied by the intermediate oxide phase is 10% to 50%.

17. The composite body as set forth in claim 14, wherein at a cross section face where the composite body is cut perpendicularly to the boundary between the cermet member and the intermediate member, in case a total of an area occupied by an entirety of the intermediate layer exists is 100%, then 30% or less of the area is occupied by a void.

18. The composite body as set forth in claim 1, in case an area of the cermet oxide phase at a cross section of the cermet member is $S_o$, an area of the cermet metal phase is $S_m$, and an area ratio between the cermet oxide phase and the cermet metal phase is $S_o/S_m$, then $S_o/S_m$, satisfies the following Equation 4:

$$60/40 \leq S_o/S_m \leq 90/10 \quad \text{(Equation 4).}$$

19. The composite body as set forth in claim 1, wherein the cermet oxide phase comprises:

a spinel ferrite phase expressed by a compositional formula of $Ni_xFe_yM_zO_4$ (x+y+z=3, x≠0, y≠0, M is at least one selected from the group consisting of Al, Co, Cr, Mn, Ti, Zr, Sn, V, Nb, Ta, and Hf), and a nickel oxide phase expressed by a compositional formula of $Ni_{x'}Fe_{1-x'}O$ (x'≠0), wherein in case entire the cermet member including the cermet oxide phase and the cermet metal phase is 100 mass %, a content ratio of the spinel phase is 40 to 80 mass %, a content ratio of the nickel oxide phase is 0 to 10 mass % (including 0 mass %), and a content ratio of the cermet metal phase is 15 to 45 mass %.

20. The composite body as set forth in claim 19, wherein an average composition of the spinel ferrite phase included in the cermet member is expressed by a compositional formula of $Ni_{x1}Fe_{y1}M_{z1}O_4$ (0.60≤x1≤0.90, 1.90≤y1≤2.40, 0.00≤z1≤0.20).

21. The composite body as set forth in claim 19, wherein the nickel oxide phase is included in the cermet member, and an average composition of the nickel oxide phase is expressed by a compositional formula of $Ni_{x'1}Fe_{1-x'1}O$ (0.70≤x'1≤1.00).

* * * * *